(12) United States Patent

Xu et al.

(10) Patent No.:    US 12,696,268 B2

(45) Date of Patent:        Jul. 28, 2026

(54) INDICATING A SHIFT OF AN UPLINK TRANSMISSION BUNDLE

(71) Applicant: QUALCOMM Incorporated, San Diego, CA (US)

(72) Inventors: Huilin Xu, Temecula, CA (US); Shijun Wu, San Diego, CA (US); Jae Ho Ryu, San Diego, CA (US); Diana Maamari, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/421,671

(22) Filed: Jan. 24, 2024

(65) Prior Publication Data

US 2025/0240780 A1      Jul. 24, 2025

(51) Int. Cl.
  *H04W 72/1268* (2023.01)
  *H04L 1/1812* (2023.01)
  *H04W 72/21* (2023.01)

(52) U.S. Cl.
  CPC ....... *H04W 72/1268* (2013.01); *H04L 1/1812* (2013.01); *H04W 72/21* (2023.01)

(58) Field of Classification Search
  CPC ....... H04L 1/08; H04L 1/1812; H04L 1/1864; H04L 1/189; H04W 72/1268; H04W 72/21
  See application file for complete search history.

(56) References Cited

U.S. PATENT DOCUMENTS

| | | | |
|---|---|---|---|
| 2022/0007411 A1* | 1/2022 | Takeda .................. | H04W 72/23 |
| 2023/0120455 A1* | 4/2023 | Guo ...................... | H04W 72/25 |
| | | | 370/329 |

| | | | |
|---|---|---|---|
| 2023/0291695 A1* | 9/2023 | Kaufmann .............. | H04L 12/40 |
| 2023/0403682 A1 | 12/2023 | Kang et al. | |
| 2024/0057060 A1* | 2/2024 | Li .............................. | H04L 5/14 |
| 2024/0381146 A1* | 11/2024 | Esswie .................. | H04W 24/10 |
| 2025/0380262 A1* | 12/2025 | Fu .......................... | H04L 5/0044 |
| 2026/0005806 A1* | 1/2026 | Kuo ....................... | H04L 1/1822 |

FOREIGN PATENT DOCUMENTS

| | | |
|---|---|---|
| WO | WO-2021226758 A1 | 11/2021 |
| WO | WO-2024007320 A1 | 1/2024 |

OTHER PUBLICATIONS

International Search Report and Written Opinion—PCT/US2025/012198—ISA/EPO—Apr. 9, 2025 (2401484WO).

* cited by examiner

*Primary Examiner* — Kashif Siddiqui

(74) *Attorney, Agent, or Firm* — Holland & Hart LLP

(57)                ABSTRACT

Methods, systems, and devices for wireless communications are described. A user equipment (UE) may receive a first control signal indicating parameters for a configured grant and a repetition factor or quantity of slots for a transport block of uplink data associated with the configured grant. The UE may transmit, via an uplink resource during a first transmission occasion of the configured grant, a second control signal indicative of a shift value for a bundle of repetitions or slots of the transport block within a first set of transmission occasions based on an uplink jitter of the bundle. The second control signal may indicate sets of unused transmission occasions based on the shift value and either the repetition factor or quantity of slots. The UE may transmit the bundle using the first set and a second set of transmission occasions according to the shift value.

30 Claims, 15 Drawing Sheets

Configured Grant Component

825

Uplink Control Signal
Component

830

Uplink Bundle Component

835

820

800

130

105

115

Network
Entity

Transceiver

1310

Antenna

1315

Communications
Manager

1320

Memory

Code

1330

1325

1340

Processor

1335

1305

1300

Figure 14:
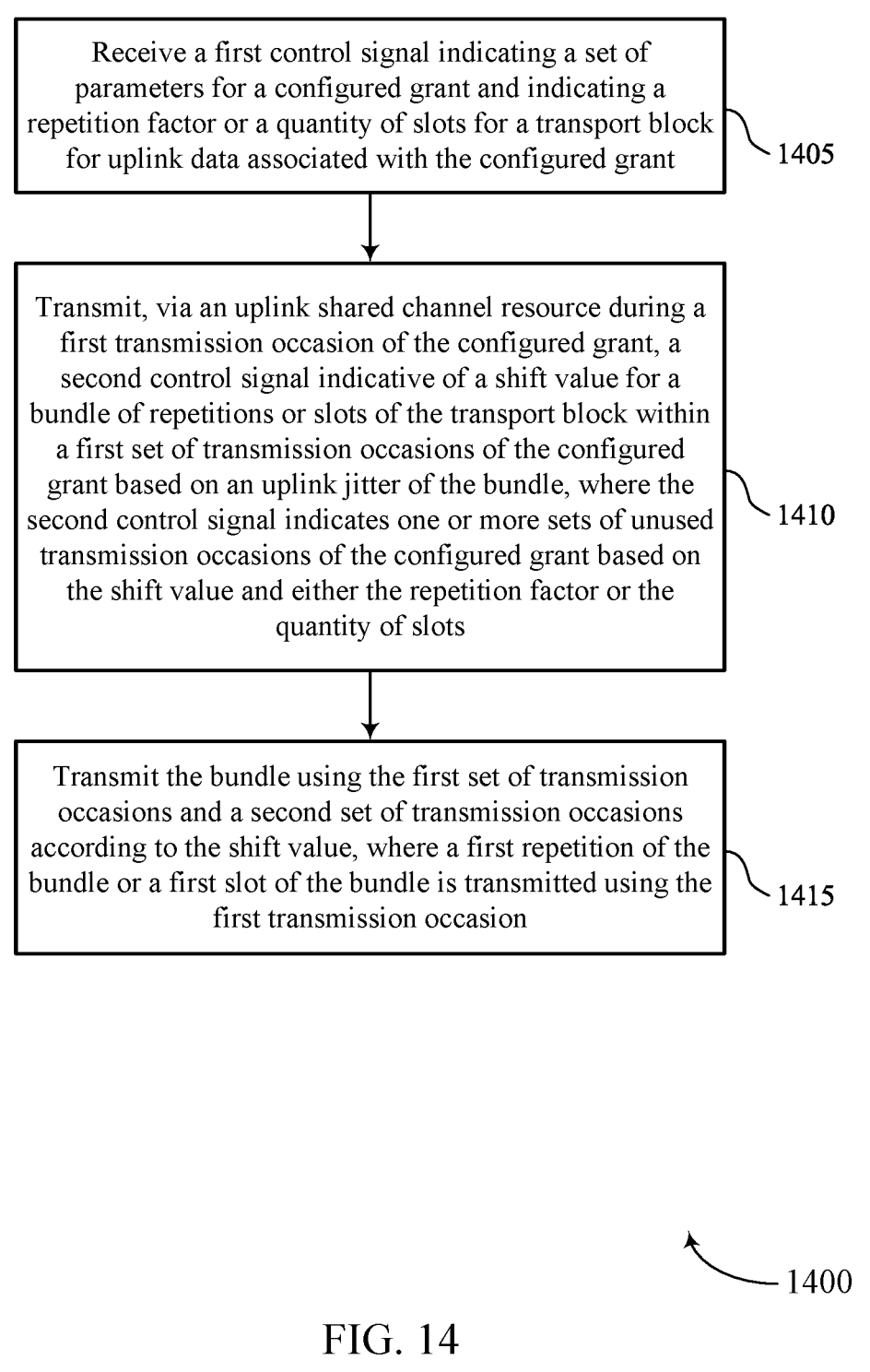

Receive a first control signal indicating a set of parameters for a configured grant and indicating a repetition factor or a quantity of slots for a transport block for uplink data associated with the configured grant

1405

Transmit, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots

1410

Transmit the bundle using the first set of transmission occasions and a second set of transmission occasions according to the shift value, where a first repetition of the bundle or a first slot of the bundle is transmitted using the first transmission occasion

Figure 15:
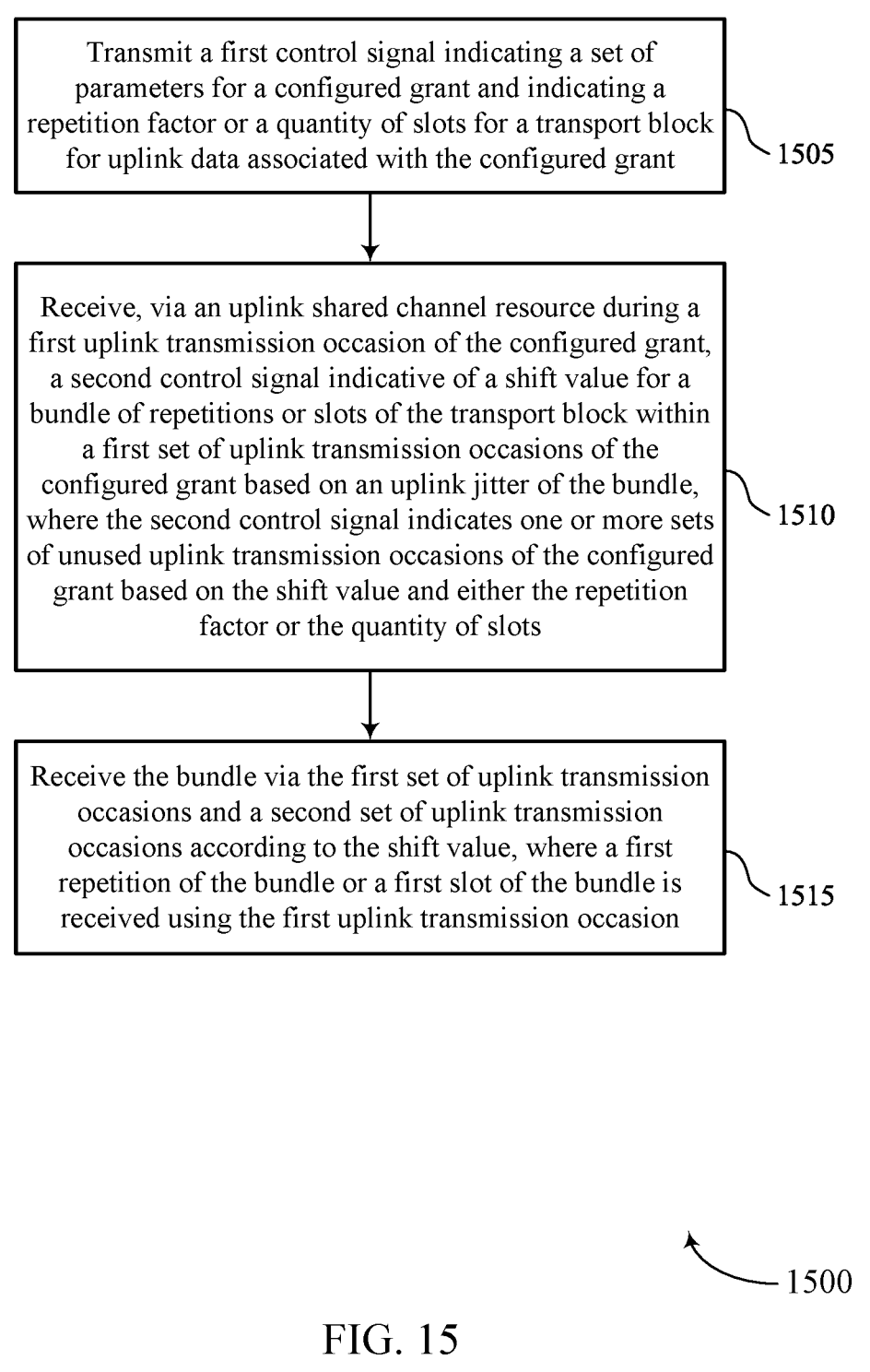

Transmit a first control signal indicating a set of parameters for a configured grant and indicating a repetition factor or a quantity of slots for a transport block for uplink data associated with the configured grant

⌐ 1505

Receive, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots

⌐ 1510

Receive the bundle via the first set of uplink transmission occasions and a second set of uplink transmission occasions according to the shift value, where a first repetition of the bundle or a first slot of the bundle is received using the first uplink transmission occasion

INDICATING A SHIFT OF AN UPLINK TRANSMISSION BUNDLE

FIELD OF TECHNOLOGY

The following relates to wireless communications, including indicating a shift of an uplink transmission bundle.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support indicating a shift of an uplink transmission bundle. For example, the described techniques enable a user equipment (UE), which is configured for repetition or transmission of a transport block over multiple slots (TBoMS), to indicate a shift value or shift offset within a set of transmission occasions, indicating jitter information for uplink data. The shift value may indicate an offset between a logical bundle of transmission occasions and an actual bundle of transmission occasions. For example, the UE may transmit the bundle of repetitions using the actual bundle of transmission occasions, which may not be aligned with logical bundles. By indicating the shift value, the UE may transmit the bundle of repetitions when the bundle of repetitions is ready (e.g., after uplink jitter), such as by using a non-first or a non-initial transmission occasion of a logical bundle of transmission occasions. If, for example, the UE experiences two transmission occasions or slots of uplink jitter, the UE may indicate a shift value of two, and the UE may start transmitting the bundle from the third transmission occasion or slot of a logical bundle of transmission occasions. The shift value may be indicated with uplink control information (UCI) that indicates unused transmission occasions, referred to as UTO-UCI. Each bit of the UTO-UCI may indicate whether the UE is using multiple transmission occasions based on a repetition factor or quantity of slots for a TBoMS configuration. In some examples, each bit of the UTO-UCI may indicate whether the UE transmits on sets of transmission occasions aligned with and after the actual bundle.

A method for wireless communications by a UE is described. The method may include receiving a first control signal indicating a set of parameters for a configured grant and indicating a repetition factor or a quantity of slots for a transport block for uplink data associated with the configured grant, transmitting, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots, and transmitting the bundle using the first set of transmission occasions and a second set of transmission occasions according to the shift value, where a first repetition of the bundle or a first slot of the bundle is transmitted using the first transmission occasion.

A UE for wireless communications is described. The UE may include at least one processor and at least one memory coupled with the at least one processor. Instructions may be stored in the at least one memory, the instructions being executable by the at least one processor, individually or in any combination, to cause the UE to receive a first control signal indicating a set of parameters for a configured grant and indicating a repetition factor or a quantity of slots for a transport block for uplink data associated with the configured grant, transmit, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots, and transmit the bundle using the first set of transmission occasions and a second set of transmission occasions according to the shift value, where a first repetition of the bundle or a first slot of the bundle is transmitted using the first transmission occasion.

Another UE for wireless communications is described. The UE may include means for receiving a first control signal indicating a set of parameters for a configured grant and indicating a repetition factor or a quantity of slots for a transport block for uplink data associated with the configured grant, means for transmitting, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots, and means for transmitting the bundle using the first set of transmission occasions and a second set of transmission occasions according to the shift value, where a first repetition of the bundle or a first slot of the bundle is transmitted using the first transmission occasion.

A non-transitory computer-readable medium storing code for wireless communications is described. The code may include instructions executable by one or more processors to receive a first control signal indicating a set of parameters for a configured grant and indicating a repetition factor or a quantity of slots for a transport block for uplink data associated with the configured grant, transmit, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots, and transmit the bundle using the first set of transmission occasions and a second set of transmission occasions according to the shift value, where a first repetition of the bundle or a first slot of the bundle is transmitted using the first transmission occasion.

In some examples of the method, UEs, and non-transitory computer-readable medium described herein, transmitting the second control signal may include operations, features, means, or instructions for transmitting, via the uplink shared channel resource, a first UCI message and a second UCI message, where the first UCI message indicates the shift value, and the second UCI message indicates the one or more sets of unused transmission occasions of the configured grant.

Some examples of the method, UEs, and non-transitory computer-readable medium described herein may further include operations, features, means, or instructions for transmitting, via the uplink shared channel resource, an UCI message including a field that indicates the shift value for the bundle and the one or more sets of unused transmission occasions of the configured grant.

Some examples of the method, UEs, and non-transitory computer-readable medium described herein may further include operations, features, means, or instructions for scrambling a demodulation reference signal with a sequence that may be indicative of the shift value, where the demodulation reference signal may be transmitted via the uplink shared channel resource with the second control signal.

In some examples of the method, UEs, and non-transitory computer-readable medium described herein, jointly encoding the second control signal with the first repetition of the transport block of the bundle of repetitions of the transport block or with the first slot of the transport block of the bundle of slot of the transport block and transmitting the first repetition or slot of the transport block with the second control signal based on jointly encoding the second control signal with the first repetition.

In some examples of the method, UEs, and non-transitory computer-readable medium described herein, each slot of the bundle or each repetition of the bundle includes a respective indication of a respective shift value and a respective one or more sets of unused transmission occasions.

In some examples of the method, UEs, and non-transitory computer-readable medium described herein, the set of parameters for the configured grant include a field location parameter for the shift value in the second control signal.

In some examples of the method, UEs, and non-transitory computer-readable medium described herein, the field location parameter for the shift value may be associated with a set of multiple configured grants including the configured grant.

In some examples of the method, UEs, and non-transitory computer-readable medium described herein, the first set of transmission occasions may be associated with a first hybrid automatic repeat request (HARQ) identifier, the second set of transmission occasions may be associated with a second HARQ identifier, and each repetition of the bundle or each slot of the bundle may be associated with the first HARQ identifier or the second HARQ identifier.

In some examples of the method, UEs, and non-transitory computer-readable medium described herein, the first repetition of the bundle or the first slot of the bundle may be associated with a first redundancy version of a redundancy version sequence.

In some examples of the method, UEs, and non-transitory computer-readable medium described herein, transmitting the second control signal may include operations, features, means, or instructions for transmitting the second control signal indicative of a second shift value for a second bundle of repetitions or slots of a second transport block within a third set of transmission occasions of the configured grant.

Some examples of the method, UEs, and non-transitory computer-readable medium described herein may further include operations, features, means, or instructions for transmitting, via a second uplink shared channel resource during a second transmission occasion of the configured grant, a third control signal indicative of an updated shift value for the second bundle.

In some examples of the method, UEs, and non-transitory computer-readable medium described herein, the first set of transmission occasions or the second set of transmission occasions includes the second transmission occasion.

In some examples of the method, UEs, and non-transitory computer-readable medium described herein, the second control signal indicates that a set of multiple sets of transmission occasions including at least the third set of transmission occasions and a fourth set of transmission occasions that follows the third set of transmission occasions in time may be used transmission occasions.

In some examples of the method, UEs, and non-transitory computer-readable medium described herein, the second control signal indicates that a set of multiple sets of transmission occasions including at least the first set of transmission occasions and the second set of transmission occasions may be used transmission occasions.

In some examples of the method, UEs, and non-transitory computer-readable medium described herein, the shift value may be in a range from zero to one less than the repetition factor or the quantity of slots.

In some examples of the method, UEs, and non-transitory computer-readable medium described herein, the first transmission occasion corresponds to a non-initial transmission occasion in time of the first set of transmission occasions.

A method for wireless communications by a network entity is described. The method may include transmitting a first control signal indicating a set of parameters for a configured grant and indicating a repetition factor or a quantity of slots for a transport block for uplink data associated with the configured grant, receiving, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots, and receiving the bundle via the first set of uplink transmission occasions and a second set of uplink transmission occasions according to the shift value, where a first repetition of the bundle or a first slot of the bundle is received using the first uplink transmission occasion.

A network entity for wireless communications is described. The network entity may include at least one processor and at least one memory coupled with the at least one processor. Instructions may be stored in the at least one memory, the instructions being executable by the at least one processor, individually or in any combination, to cause the network entity to transmit a first control signal indicating a set of parameters for a configured grant and indicating a repetition factor or a quantity of slots for a transport block for uplink data associated with the configured grant, receive, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots, and receive the bundle via the first set of uplink transmission occasions and a second set of uplink transmission occasions according to the shift value, where a first repetition of the bundle or a first slot of the bundle is received using the first uplink transmission occasion.

Another network entity for wireless communications is described. The network entity may include means for transmitting a first control signal indicating a set of parameters for a configured grant and indicating a repetition factor or a quantity of slots for a transport block for uplink data associated with the configured grant, means for receiving, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots, and means for receiving the bundle via the first set of uplink transmission occasions and a second set of uplink transmission occasions according to the shift value, where a first repetition of the bundle or a first slot of the bundle is received using the first uplink transmission occasion.

A non-transitory computer-readable medium storing code for wireless communications is described. The code may include instructions executable by one or more processors to transmit a first control signal indicating a set of parameters for a configured grant and indicating a repetition factor or a quantity of slots for a transport block for uplink data associated with the configured grant, receive, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots, and receive the bundle via the first set of uplink transmission occasions and a second set of uplink transmission occasions according to the shift value, where a first repetition of the bundle or a first slot of the bundle is received using the first uplink transmission occasion.

In some examples of the method, network entities, and non-transitory computer-readable medium described herein, receiving the second control signal may include operations, features, means, or instructions for receiving, via the uplink shared channel resource, a first UCI message and a second UCI message, where the first UCI message indicates the shift value, and the second UCI message indicates the one or more sets of unused uplink transmission occasions of the configured grant.

Some examples of the method, network entities, and non-transitory computer-readable medium described herein may further include operations, features, means, or instructions for receiving, via the uplink shared channel resource, an UCI message including a field that indicates the shift value for the bundle and the one or more sets of unused uplink transmission occasions of the configured grant.

Some examples of the method, network entities, and non-transitory computer-readable medium described herein may further include operations, features, means, or instructions for receiving a demodulation reference signal via the uplink shared channel resource with the second control signal, where a sequence of the demodulation reference signal may be indicative of the shift value.

In some examples of the method, network entities, and non-transitory computer-readable medium described herein, receiving the second control signal may include operations, features, means, or instructions for receiving the first repetition of the transport block with the second control signal based on a joint encoding of the second control signal with the first repetition.

In some examples of the method, network entities, and non-transitory computer-readable medium described herein, the set of parameters for the configured grant include a field location parameter for the shift value in the second control signal.

In some examples of the method, network entities, and non-transitory computer-readable medium described herein, the first set of uplink transmission occasions may be associated with a first HARQ identifier, the second set of uplink transmission occasions may be associated with a second HARQ identifier, and each repetition or slot of the bundle may be associated with the first HARQ identifier or the second HARQ identifier.

In some examples of the method, network entities, and non-transitory computer-readable medium described herein, the first repetition or the first slot of the bundle may be associated with a first redundancy version of a redundancy version sequence.

In some examples of the method, network entities, and non-transitory computer-readable medium described herein, receiving the second control signal may include operations, features, means, or instructions for receiving the second control signal indicative of a second shift value for a second bundle of repetitions or slots of a second transport block within a third set of uplink transmission occasions of the configured grant.

Some examples of the method, network entities, and non-transitory computer-readable medium described herein may further include operations, features, means, or instructions for receiving, via a second uplink shared channel resource during a second uplink transmission occasion of the configured grant, a third control signal indicative of an updated shift value for the second bundle.

In some examples of the method, network entities, and non-transitory computer-readable medium described herein, the second control signal indicates that a set of multiple sets of uplink transmission occasions including at least the third set of uplink transmission occasions and a fourth set of uplink transmission occasions that follows the third set of uplink transmission occasions in time may be used uplink transmission occasions.

BRIEF DESCRIPTION OF THE DRAWINGS

FIGS. 14 and 15 show flowcharts illustrating methods that support indicating a shift of an uplink transmission bundle in accordance with one or more aspects of the present disclosure.

DETAILED DESCRIPTION

Figure 1:
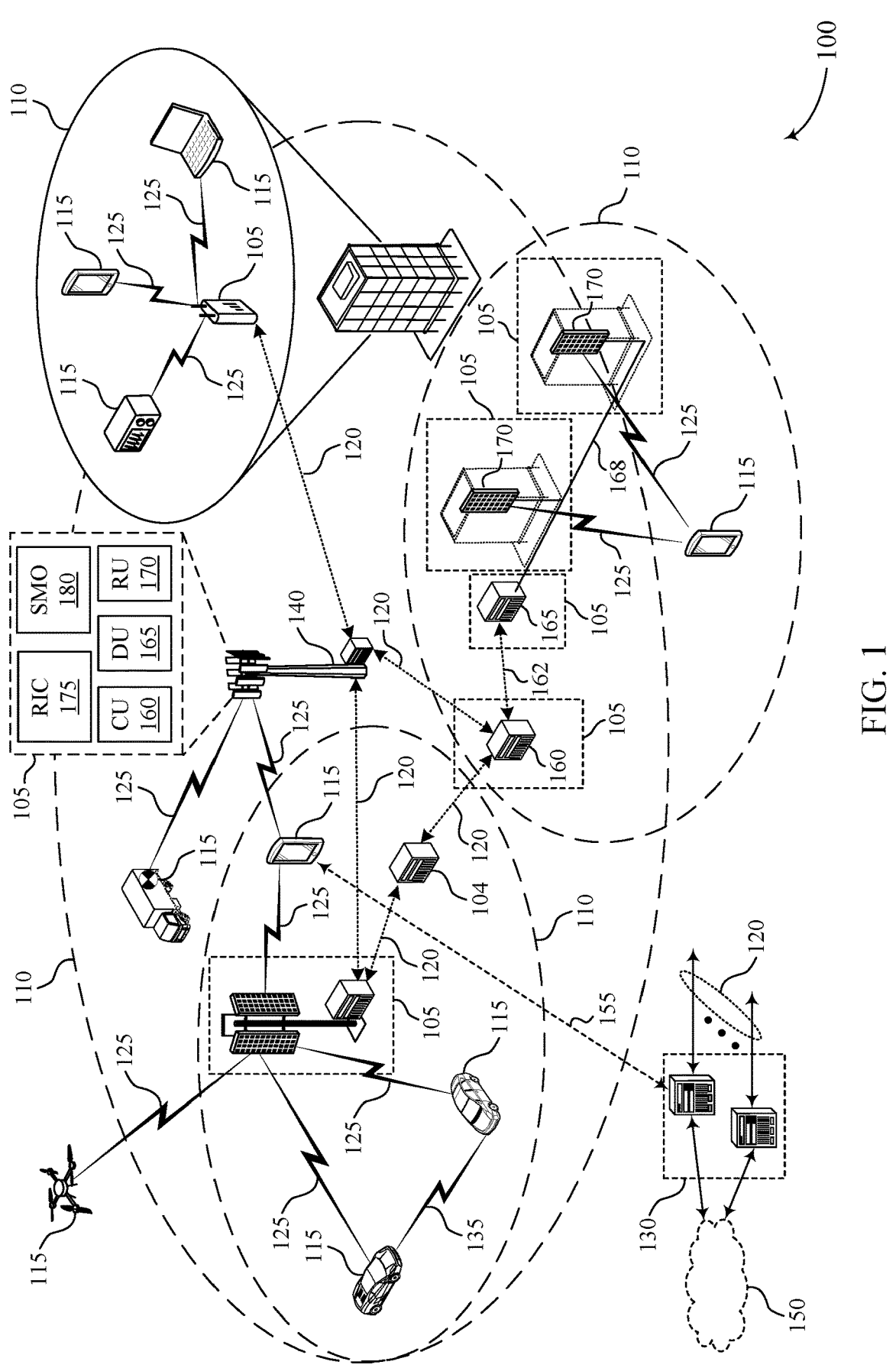
FIG. 1 shows an example of a wireless communications system that supports indicating a shift of an uplink transmission bundle in accordance with one or more aspects of the present disclosure.

For some types of wireless signaling, such as extended reality (XR) signaling and video signaling, a wireless communication device may periodically transmit data that has a variable size. For example, a user equipment (UE) may generate XR uplink video data, but XR uplink video data may have unpredictable size. In some examples, the unpredictable size of the data may lead to jitter or a variable timing that the data is ready to be transmitted. Some wireless communications systems may use a configured grant to allocate periodic uplink resources for a UE to transmit uplink data for XR video and similar types of signaling. A network entity may allocate a large amount of uplink resources for the configured grant to ensure the UE has sufficient resources to transmit the uplink data. For example, the network entity may allocate enough resources in an XR video generation cycle for the UE to transmit a largest possible uplink XR video data packet. Allocating the largest possible size of resources may frequently be an over-allocation of resources, as most uplink data packets will not use all of the allocated resources. To prevent wasting resources that are not used, the UE may transmit uplink control information (UCI) indicating unused transmission occasions (UTO-UCI). The network may reallocate the resources of the unused transmission occasions to other wireless communication devices, which may improve spectral efficiency.

If a UE has poor coverage, such as when operating on a cell edge, the UE may implement coverage enhancement operations. For example, the UE may transmit multiple repetitions of a transport block, or the UE may transmit a same transport block over multiple slots (TBoMS). For repetition, the UE may transmit a bundle of repetitions of a transport block using multiple uplink transmission occasions. For TBoMS, the UE may transmit a same transport block over a bundle of slots, which may correspond to multiple uplink transmission occasions. In some wireless communications systems, some techniques for indicating unused transmission occasions (e.g., UTO-UCI) in a configured grant may be inefficient when used with repetition or TBoMS. For example, each bit in UTO-UCI in these systems may indicate one uplink transmission occasion, but repetition and TBoMS may transmit a same transport block using multiple uplink transmission occasions. If the UE does not have additional data to transmit, the UE may skip an entire repetition bundle or slot bundle including multiple uplink transmission occasions of the configured grant. UTO-UCI may be used efficiently for repetition and TBoMS if each bit in UTO-UCI indicates whether an entire bundle (e.g., of repetitions or slots) is skipped. For example, the UE may be configured to transmit four repetitions of a transport block, and each bit in the UTO-UCI may indicate whether four consecutive transmission occasions are used or unused. However, UEs in some wireless communications systems may only support transmission of bundles of repetitions that are aligned with the configured grant. For example, the UE may only transmit an initial repetition of a bundle of repetitions at a first transmission occasion of a set of transmission occasions. If the UE experiences any uplink jitter (e.g., the uplink data is ready to transmit slightly early or slightly late), the UE may delay transmission of the uplink data and waste uplink resources. For example, if the UE is configured to transmit four repetitions of a transport block, and uplink jitter delays for the first transmission occasion, the UE may start transmission of the bundle until a new set of transmission occasions (e.g., after all four transmission occasions of the first set).

A UE may transmit an indication of a shift value or shift offset to indicate jitter information for uplink data. For example, the UE may be configured with a configured grant for uplink data transmission, and the UE may transmit repetitions of a transport block or implement TBoMS. The shift value may indicate an offset between a logical bundle of transmission occasions and an actual bundle of transmission occasions. For example, the UE may transmit the bundle of repetitions using the actual bundle of transmission occasions, which may not be aligned with logical bundles. By indicating the shift value, the UE may transmit the bundle of repetitions when the bundle of repetitions is ready (e.g., after uplink jitter), such as by using a non-first transmission occasion of a logical bundle of transmission occasions. If, for example, the UE experiences two transmission occasions or slots of uplink jitter, the UE may indicate a shift value of two, and the UE may start transmitting the bundle of repetitions from the third transmission occasion or slot of a logical bundle of transmission occasions. For example, the actual bundle may span two logical bundles of transmission occasions. The shift value may be transmitted with UTO-UCI. Each bit of the UTO-UCI may indicate whether the UE is using multiple transmission occasions based on a repetition factor or quantity of slots for a TBoMS configuration. In some examples, each bit of the UTO-UCI may indicate whether the UE transmits on sets of transmission occasions aligned with and after the actual bundle. In some examples, a redundancy version sequence may align with the actual bundle instead of the logical bundles. If the actual bundle spans two logical bundles of transmission occasions, the logical bundles may have different hybrid automatic repeat request (HARQ) identifiers. In some examples, the repetitions of transport blocks or the multiple slots for the transport block may all be associated with a same HARQ identifier, corresponding to either the HARQ identifier of the first logical bundle or the second logical bundle.

Aspects of the disclosure are initially described in the context of wireless communications systems. Aspects of the disclosure are further illustrated by and described herein with reference to apparatus diagrams, system diagrams, and flowcharts that relate to indicating a shift of an uplink transmission bundle.

FIG. 1 shows an example of a wireless communications system 100 that supports indicating a shift of an uplink transmission bundle in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170)

may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described herein with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support sameslot HARQ feedback, in which case the device may provide HARQ feedback in a specific slot for data received via a previous symbol in the slot. In some other examples, the device may provide HARQ feedback in a subsequent slot, or according to some other time interval.

A UE 115 may transmit XR uplink video data by configured grant uplink resources, such as configured grant physical uplink shared channel (PUSCH) resources. Configured grant may provide periodic, pre-configured uplink resources, such as uplink transmission occasions. Configured grant may avoid scheduling request-based or buffer status report-based dynamic resource requests from the UE 115 and, in response, assignment by the network. A transmission occasion described herein may correspond to a valid configured grant PUSCH occasion that does not collide with downlink resources or downlink signaling or a synchronization signal block (SSB) symbol.

Configured grant may be suitable for low latency periodic traffic like XR video. Video packet size may be large and random or unpredictable. The network may configure sufficient uplink resources for the configured grant based on a largest possible XR video packet size. Scheduling a large amount of resources may minimize delay in XR video transfer but may be resource inefficient due to over-budgeting uplink resources, which may could lead to resource waste. For example, the pre-configured resources within an XR video generation cycle may be larger than the average video packet size.

To prevent wasting resources that are not used, a UE 115 may transmit UCI which indicates unused transmission occasions (e.g., UTO-UCI). UTO-UCI may include a bitmap where each bit indicates a pre-configured configured grant PUSCH occasion is used or unused. A UE 115 may transmit UTO-UCI via configured grant PUSCH, and the UTO-UCI may indicate future configured grant PUSCH occasions. In some examples, a bitmap size of UTO-UCI may be config-ured by higher layer signaling, such as RRC signaling from the network.

If a UE 115 has poor coverage, such as when operating on a cell edge, the UE 115 may implement coverage enhance-ment operations. In some scenarios, coverage enhancements such as repetition and TBoMS may be useful for augmented reality or XR uplink video transfer in poor coverage sce-narios. In some examples, the UE 115 may be configured for repetition. For example, the UE 115 may transmit multiple repetitions of a transport block over multiple configured grant PUSCH transmission occasions. The multiple repeti-tions of the transport block may be referred to as a bundle or repetitions. For example, the UE 115 may be configured to transmit four repetitions of a transport block in four consecutive uplink transmission occasions (e.g., four con-secutive configured grant PUSCH transmission occasions).

In some examples, the UE 115 may be configured for TBoMS. In TBoMS, the UE may transmit a same transport block using multiple slots. In some examples, each slot may correspond to an uplink transmission occasion or a config-ured grant PUSCH transmission occasion. The multiple slots may be referred to as a bundle of slots. The term "bundle" may be applied for multiple coverage enhancement tech-niques, including repetition and TBoMS. In some examples, a bundle may refer to multiple uplink transmission occasions used to transmit uplink data according to a coverage enhancement technique. In some examples, a bundle may refer to a bundle of repetitions of a transport block trans-mitted over multiple uplink transmission occasions. In some examples, a bundle may refer to a bundle of multiple slots used to transmit a same transport block.

In some wireless communications systems, some tech-niques for indicating unused transmission occasions (e.g., UTO-UCI) in a configured grant may be inefficient when used with repetition or TBoMS. For example, each bit in UTO-UCI in these systems may indicate one uplink trans-mission occasion, but repetition and TBoMS may transmit a same transport block using multiple uplink transmission occasions. If a UE 115 does not have additional data to transmit, the UE 115 may skip an entire repetition bundle or slot bundle including multiple uplink transmission occasions of the configured grant. UTO-UCI may be used efficiently for repetition and TBoMS if each bit in UTO-UCI indicates whether an entire bundle (e.g., of repetitions or slots) is skipped. For example, the UE 115 may be configured to transmit four repetitions of a transport block, and each bit in the UTO-UCI may indicate whether four consecutive trans-mission occasions are used or unused.

However, UEs 115 in some wireless communications systems may only support transmission of bundles of rep-etitions that are aligned with the configured grant. For example, the UE 115 may only transmit an initial repetition of a bundle of repetitions at a first transmission occasion of a set of transmission occasions. If the UE experiences any uplink jitter (e.g., the uplink data is ready to transmit slightly early or slightly late), the UE 115 may delay transmission of the uplink data and waste uplink resources. For example, if the UE is configured to transmit four repetitions of a transport block, and uplink jitter delays for the first transmission occasion, the UE 115 may start transmission of the bundle until a new set of transmission occasions (e.g., after all four transmission occasions of the first set). If the UE 115 can only transmit an initial transmission of a transport block of a first occasion of the actual repetitions of K occasions, there may be additional latency by up to K−1 occasions and waste of resources.

A UE 115 may transmit an indication of a shift value or shift offset to indicate jitter information for uplink data. For example, the UE 115 may be configured with a configured grant for uplink data transmission, and the UE 115 may transmit repetitions of a transport block or implement TBoMS. The shift value may indicate an offset between a logical bundle of transmission occasions and an actual bundle of transmission occasions. For example, the UE 115 may transmit the bundle of repetitions using the actual bundle of transmission occasions, which may not be aligned with logical bundles. By indicating the shift value, the UE may transmit the bundle of repetitions when the bundle of repetitions is ready (e.g., after uplink jitter), such as by using a non-first transmission occasion of a logical bundle of transmission occasions.

Figure 2:
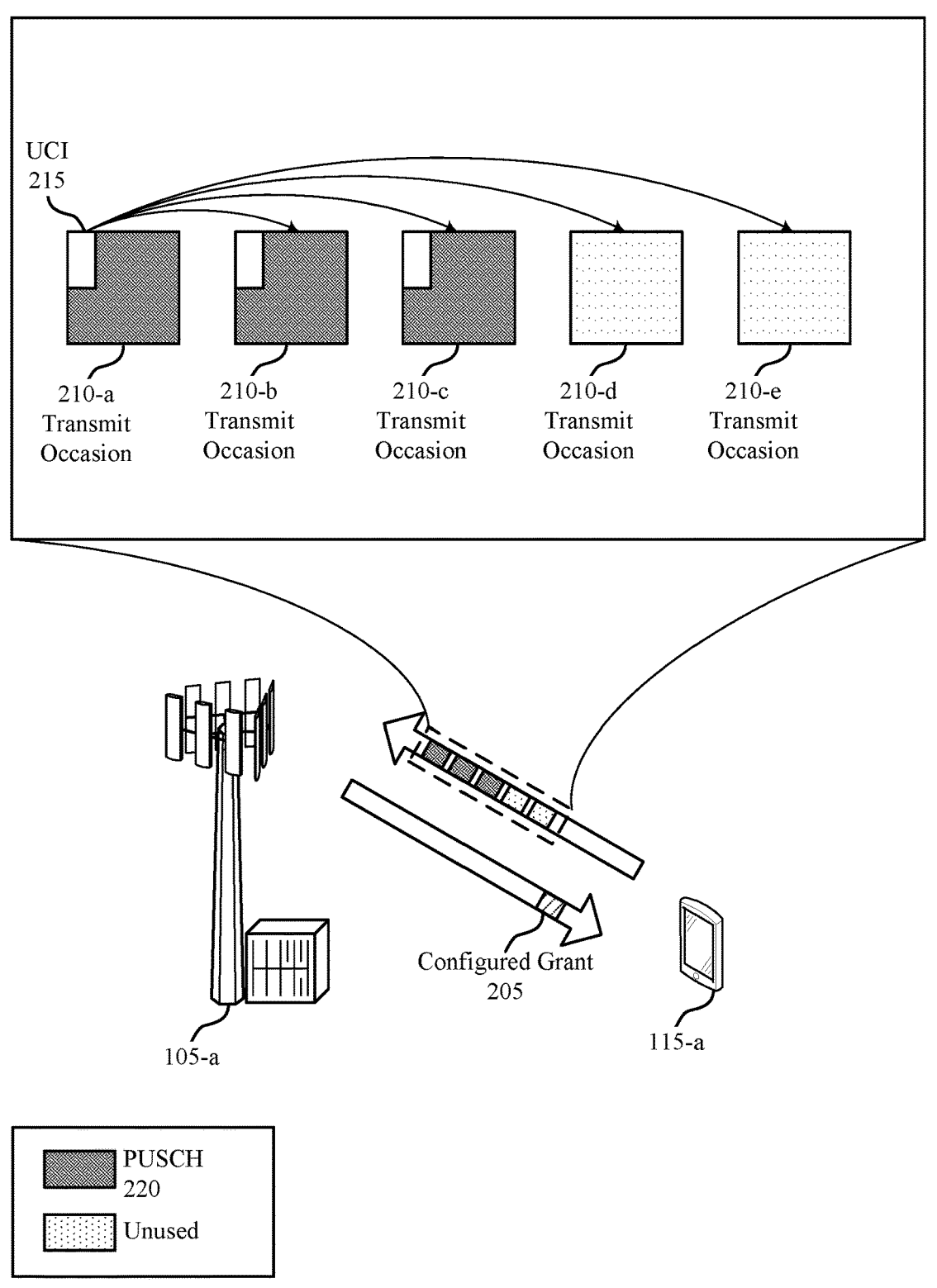
FIG. 2 shows an example of a wireless communications system that supports indicating a shift of an uplink transmission bundle in accordance with one or more aspects of the present disclosure.

FIG. 2 shows an example of a wireless communications system 200 that supports indicating a shift of an uplink transmission bundle in accordance with one or more aspects of the present disclosure. The wireless communications system 200 may implement aspects of the wireless commu-nications system 100. The wireless communications system 200 may include a UE 115-*a* and a network entity 105-*a*, which may be respective examples of a UE 115 and a network entity 105 described herein.

The network entity 105-*a* may transmit a control signal 205 to configure the UE 115-*a* with a configured grant. The configured grant may provide periodic uplink resources, such as uplink transmission occasions 210, for the UE 115-*a* to transmit uplink data via an uplink shared channel or PUSCH 220. For example, the UE 115-*a* may transmit uplink data, such as XR uplink video data, to the network entity 105-*a* using the resources of the configured grant.

The configured grant may provide a large quantity of uplink transmission occasions 210 to the UE 115-*a*. For example, a size of the uplink data may be unpredictable, and the configured grant provides sufficient resources for the UE 115-*a* to transmit a largest possible uplink data packet. To avoid wasting uplink resources, the UE 115-*a* may transmit UTO-UCI to indicate unused uplink transmission occasions. The UTO-UCI may be transmitted via PUSCH resources of the configured grant and may indicate future uplink trans-mission occasions which are not used by the UE 115-*a*.

For example, the UE 115-*a* may transmit uplink data via PUSCH in a first uplink transmission occasion 210-*a*. The UE 115-*a* may transmit a UCI 215 via the PUSCH during the first uplink transmission occasion 210-*a*. The UCI 215 may include UTO-UCI, which may indicate which of the follow-ing uplink transmission occasions of the configured grant are used or unused. The UTO-UCI may indicate a bitmap of {0, 0, 1, 1}, indicating that the UE 115-*b* is to use a second uplink transmission occasion 210-*b* and a third uplink trans-mission occasion 210-*c*, and the UE 115-*a* is not to use a fourth uplink transmission occasion 210-*d* or a fifth uplink transmission occasion 210-*e*. For example, the second uplink transmission occasion 210-*b* and the third uplink transmission occasion 210-*c* may be used, corresponding to a 0 in the UTO-UCI, and the fourth uplink transmission occasion 210-*d* and the fifth uplink transmission occasion 210-*e* may be unused, corresponding to a 1 in the UTO-UCI.

The UE 115-*a* may transmit uplink data via a PUSCH 220 in the second uplink transmission occasion 210-*b* and the third uplink transmission occasion 210-*c*. In some examples, the UE 115-*a* may transmit UCI 215 with the uplink data indicating UTO-UCI. For example, UTO-UCI in a UCI 215 transmitted during the second uplink transmission occasion 210-*b* may have a bitmap of {0, 1, 1, 1}, and UTO-UCI in a UCI 215 transmitted during the third uplink transmission occasion 210-*c* may have a bitmap of {1, 1, 1, 1}. For example, the UTO-UCI transmitted during the third uplink transmission occasion 210-*c* may indicate that the UE 115-*a* is releasing four additional uplink transmission occasions 210 of the configured grant. In some examples, the UTO-UCI transmitted during the third uplink transmission occasion 210-*c* may indicate that the UE 115-*a* is releasing remaining uplink transmit opportunities for the cycle of the configured grant.

The UE 115-*a* may be configured for coverage enhancement techniques, such as repetition or TBoMS. For repetition, the UE 115-*a* may be configured to transmit multiple repetitions of a transport block. For TBoMS, the UE 115-*a* may be configured to transmit a same transport block over multiple slots. For example, the UE 115-*a* may be configured to transmit four repetitions of a transport block, or the UE 115-*a* may be configured to transmit a same transport block over four slots for TBoMS. In some examples, the configured grant may schedule sets of four uplink transmission occasions 210 based on the coverage enhancement techniques.

In some examples, UTO-UCI may be used to indicate whether a set of uplink transmission occasions 210 are used or not based on whether repetition or TBoMS is configured at the UE 115-*a*. For example, if a UE 115-*a* is configured with a repetition factor of four or configured to transmit a transport block over four slots, a '1' in UTO-UCI may indicate that four uplink transmission occasions 210 are not used, and a '0' may indicate that four uplink transmission occasions 210 are used.

The uplink data may have jitter or variation of when the uplink data arrives at the UE 115-*a*. In some systems, a wireless communication device may only transmit an initial transmission of a transport block at a first transmission occasion of a set of transmission occasions configured for repetition. For example, if the wireless communication device is configured to transmit four repetitions of a transport block but experiences jitter during a first transmission occasion, the wireless communication device may wait until all four transmission occasions of the first set of transmission occasions have passed, and the wireless communication device may transmit a first repetition of the transport block during a first transmission occasion of a second set of transmission occasions.

The wireless communications system 200 may support techniques for a UE 115, such as the UE 115-*a*, to transmit an indication of a shift value to indicate jitter information. For example, the configured grant may schedule sets of K uplink transmission occasions 210 based on the UE 115-*a* using a repetition factor of K or transmitting a transport block over K slots. If the UE 115-*a* experiences a jitter of two uplink transmission occasions 210, the UE 115-*a* may indicate a shift value of two, and the UE 115-*a* may begin transmission on a third uplink transmission occasion 210. In some examples, the shift value may be indicated via the UCI 215. For example, the UCI 215 may indicate both the UTO-UCI and the shift value.

Figure 3:
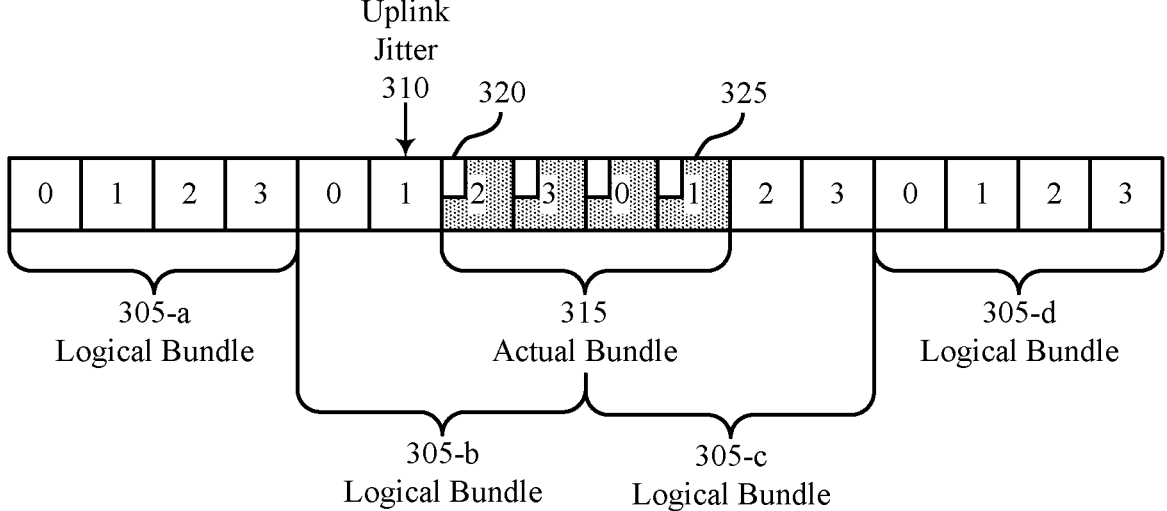
FIG. 3 shows an example of a shift value indication that supports indicating a shift of an uplink transmission bundle in accordance with one or more aspects of the present disclosure.

FIG. 3 shows an example of a shift value indication 300 that supports indicating a shift of an uplink transmission bundle in accordance with one or more aspects of the present disclosure.

A UE 115 may receive a configured grant for uplink data transmission. The UE 115 may be configured to perform a coverage enhancement technique, such as repetition or TBoMS. For example, the UE 115 may be configured to transmit a bundle of four repetitions of a transport block or to transmit a transport block over a bundle of four slots. The configured grant may schedule logical bundles 305 of four transmission occasions. For example, a first logical bundle 305-*a* may include four uplink transmission occasions.

In some examples, the uplink data may have jitter 310. For example, the uplink data may arrive late at the UE 115, such that the UE 115 cannot transmit the uplink data during a first transmission occasion of a cycle of the configured grant. For example, the uplink data may have uplink jitter such that the uplink data arrives during a second transmission occasion of a second logical bundle 305-*b* of the cycle of the configured grant.

The UE 115 may transmit the uplink data after the uplink data arrives at the UE 115. For example, the UE 115 may begin transmitting the uplink data via PUSCH 325 using a third uplink transmission occasion of the second logical bundle 305-*b*. If implementing repetition, the UE 115 may transmit a first repetition of the transport block during a third transmission occasion of the second logical bundle 305-*b*. The UE 115 may transmit additional repetitions in following transmission occasions. For example, the UE 115 may transmit a repetition of the transport block using the third and four uplink transmission occasions of the second logical bundle 305-*b* and the first and second uplink transmission occasions of the third logical bundle 305-*c*. If implementing TBoMS, the UE 115 may transmit the transport block over multiple slots or transmission occasions starting from the third transmission occasion of the second logical bundle 305-*b*.

The transmission occasions used for actual transmission of the transport block or repetitions of the transport block may be referred to as an actual bundle 315. The actual bundle 315 may not be aligned with the logical bundles 305. For example, the actual bundle 315 may span from part of the second logical bundle 305-*b* to part of the third logical bundle 305-*c*.

The UE 115 may indicate a shift value between a logical bundle 305 and the actual bundle 315 for configured grant PUSCH transmissions. For example, if a bundle includes K configured grant PUSCH transmission occasions, the shift value may have a value ranging from 0 to K−1. K may be a quantity of repetitions (e.g., a repetition factor) or a quantity of slots for TBoMS. The shift value, S, may be the transmission occasion index of the first transmission occasion within a logical bundle after the uplink jitter. For example, the shift value S may be two, indicating two transmission occasions of uplink jitter during the second logical bundle 305-*b*. The first logical bundle 305-*a* may start from the first transmission occasion configured for a period of the configured grant. In some examples, each configured grant period may be configured to have an integer multiple of logical bundles 305.

In some examples, the UE 115 may be configured to transmit multiple repetitions of a transport block using a redundancy version sequence. If repetition is configured for the configured grant, a corresponding redundancy version sequence (e.g., {0, 2, 3, 1} or {0, 3, 0, 3}) may be aligned with the actual bundle 315. The first redundancy version value may be applied to the configured grant PUSCH with occasion index S. For example, if the UE 115 is using a redundancy version sequence of {0, 2, 3, 1}, PUSCH of the first transmit occasion of the actual bundle 315 may be associated with a redundancy version value of 0.

In some examples, UTO-UCI may indicate transmission occasions are used with respect to bundles of transmission occasions. For example, each bit of the UTO-UCI may indicate whether PUSCH is transmitted in bundles starting after the actual bundle 315. For example, each bit of the UTO-UCI may indicate whether additional bundles of four transmission occasions are used or unused, starting after the actual bundle 315. In some examples, each bit of the UTO-UCI may indicate whether PUSCH is transmitted over transmission occasions of logical bundles 305. For example, a UTO-UCI transmitted via a UCI 320 in a first transmission occasion of the actual bundle 315 may indicate that the third logical bundle 305-*c* is used (e.g., for the second half of the actual bundle 315) and the fourth logical bundle 305-*d* is not used.

The shift value may be indicated in the first transmission occasion of the actual bundle 315 or in all transmission occasions of the actual bundle. In some examples, the shift value may be indicated via a UCI 320. In some examples, the shift value may be indicated via a standalone UCI or in a separate UCI than UTO-UCI. In some examples, the shift value may be indicated with the UTO-UCI (e.g., if UTO-UCI is configured). For example, the shift value may be added to the UTO-UCI, such as by appending or prepending the shift value to the bitmap used to indicate UTO-UCI. For example, eight bits of a UTO-UCI bitmap may be used to indicate unused transmission occasions, and an additional two bits may be used to indicate a shift value (e.g., if a repetition factor of 4 is used). If indicated via the bitmap of UTO-UCI, the shift value indication may be transmitted in a first occasion of the actual bundle 315 while the indication for unused bundles may be transmitted in remaining transmission occasions of the actual bundle 315.

A UCI 320 to indicate the shift value may be jointly encoded with the configured grant PUSCH or encoded separately from the configured grant PUSCH. In some examples, encoding the UCI 320 indicating the shift value separately may increase robustness, as the network may detect the shift value even if decoding of the PUSCH fails. If joint encoding is used, redundancy version sequences may be restricted. For example, a UE 115 may be configured to use a redundancy version sequence of {0, 3, 0, 3} or {0, 0, 0, 0} when jointly encoding PUSCH with the UCI 320 that indicates the shift value, but the UE 115 may not be configured to use a redundancy version sequence of {0, 2, 3, 1}.

In some examples, the shift value may be indicated based on a DMRS scrambling. For example, the shift value may be implicitly indicated by different DMRS scrambling operations or scrambling sequences. For example, a first DMRS scrambling may indicate a first shift value, and a second DMRS scrambling may indicate a second shift value. A network entity 105 may perform blind detection to detect the DMRS sequence and identify the indicated shift value.

A UCI 320 may include one or more fields each indicating a shift value. For example, a first field may indicate a shift offset for a configured grant PUSCH of the current transmission occasion where the UCI 320 is transmitted. A network entity 105 may configure a field for the configured grant configuration, such as by a field location parameter in an RRC configuration for the configured grant. Multiple configured grants may be configured with the same shift offset field in the UCI 320. For example, jitter for traffic carried by the configured grant PUSCHs may have a same shift offset, and the different configured grants may have a same quantity of transmission occasions per bundle (e.g., have a same K value).

If there is jitter, the actual bundle 315 may span different logical bundles 305 associated with different HARQ identifiers. For example, the second logical bundle 305-*b* may be associated with a HARQ identifier of 1, and the third logical bundle 305-*c* may be associated with a HARQ identifier of 2. In some examples, a HARQ identifier for the configured grant PUSCH occasions of the actual bundle 315 may be determined based on the first configured grant PUSCH occasion of the actual bundle 315. If the first transmission occasion of the actual bundle 315 falls in a logical bundle 305 with a HARQ identifier i, all transmission occasions in the actual bundle 315 may share the HARQ identifier i. For example, a HARQ identifier for the configured grant PUSCH of the actual bundle 315 may be the HARQ identifier for the second logical bundle 305-*b*, as the first uplink transmission occasion of the actual bundle 315 may correspond to the second logical bundle 305-*b*. In some other examples, the HARQ identifier for the transmission occasions of the actual bundle 315 may be based on the HARQ identifier of the logical bundle including the last transmission occasion of the actual bundle 315.

Figure 4:
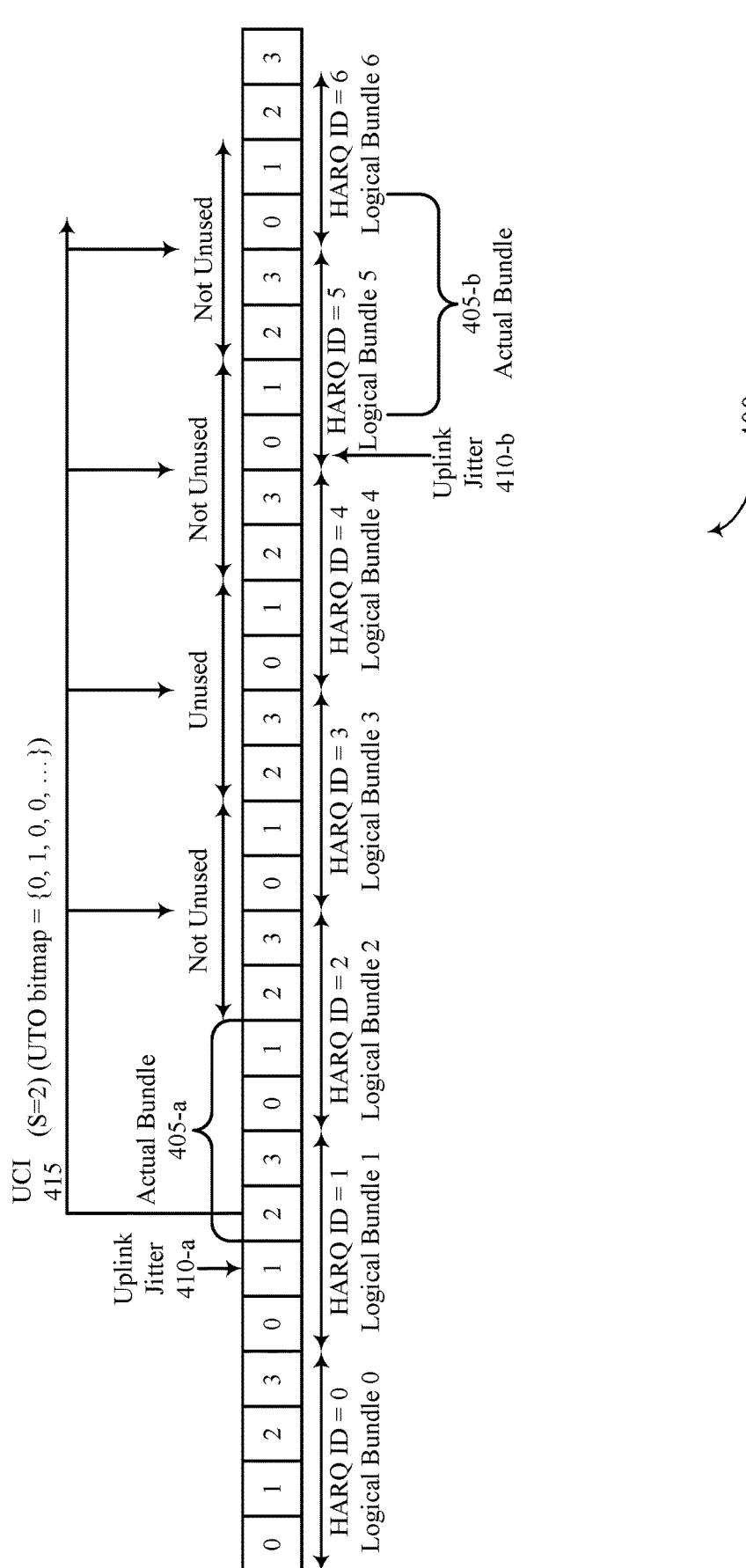
FIG. 4 shows an example of a shift value indication that supports indicating a shift of an uplink transmission bundle in accordance with one or more aspects of the present disclosure.

FIG. 4 shows an example of a shift value indication 400 that supports indicating a shift of an uplink transmission bundle in accordance with one or more aspects of the present disclosure.

A UE 115 may receive a configured grant for uplink data transmission. The UE 115 may be configured to perform a coverage enhancement technique, such as repetition or TBoMS. For example, the UE 115 may be configured to transmit a bundle of K repetitions of a transport block or to transmit a transport block over a bundle of K slots. In some examples, the uplink data may have jitter 410. The UE 115 may transmit the uplink data after the uplink data arrives at the UE 115. For example, the UE 115 may begin transmitting uplink data during an actual bundle 405-*a* after an uplink jitter 410-*a*. The transmission occasions used for actual transmission of the transport block or repetitions of the transport block may be referred to as an actual bundle 405. The actual bundle 405 may not be aligned with logical bundles of transmission occasions from the first transmission occasion of the period of the configured grant.

The UE 115 may transmit UCI to indicate unused transmission opportunities of the configured grant. In some examples, the UE 115 may indicate a shift value or jitter information for an uplink data transmission or transport block. An uplink control signal may indicate jitter information or unused transmission occasion information for multiple data packets. For example, a UTO-UCI may indicate configured grant PUSCHs data for two data packets with different uplink jitter.

The UE 115 may transmit uplink data via PUSCH of a first transmission occasion of the actual bundle 405-*a*. The UE 115 also may transmit UCI 415 during the first transmission occasion. The UCI 415 may include UTO-UCI and indicate a shift value. For example, the shift value may be 2, and the UTO bitmap may be {0, 1, 0, 0, . . . }. The UTO bitmap may indicate that a next bundle (e.g., a second bundle) is used, a third bundle after that is unused, a fourth bundle is used, and a fifth bundle is used. The UTO-UCI, transmitted during a transmission occasion of the actual bundle 405-*a* for a first data packet, may indicate which actual bundles 405 may be expected to used or unused to transmit a second data packet. For example, if the UE 115 is uncertain about the jitter value for a next data packet, the UE 115 may reserve all configured grant PUSCH occasions that may transmit the next data packet by indicating the configured grant PUSCH occasions are not unused in the UTO-UCI. However, the actual jitter for the second data packet may be unknown until the second data packet arrives at the UE 115.

In some examples, the UE 115 may change or update a shift value for a configured grant configuration. After changing the shift value, the actual bundles, or positions of the actual bundles, may be redetermined. For example, the second data packet may arrive at the UE 115 after an uplink jitter 410-b. The UE 115 may transmit the second data packet using K transmission occasions in the actual bundle 405-b. For example, the UE 115 may transmit a transport block for the data packet K times, or the UE 115 may transmit the transport block over K slots. The UE 115 may transmit a UCI in a first transmission occasion of the actual bundle 405-b, and the UCI 415 may update the shift value for the configured grant. For example, the UCI 415 indicated via the first transmission occasion of the actual bundle 405-b may indicate that the shift value is 1 with respect to logical bundles or 3 with respect to the current shift value and the actual bundle 405-a.

In some examples, the UE 115 may change the shift offset for a configured grant after the next data frame cycle starts. For example, the UE 115 may update the shift value at the start of a configured grant period configured with multiple configured grant PUSCH transmission occasions. For example, the UE 115 may update the shift value at the start of the configured grant period if all indicated configured grant PUSCH occasions neighboring the current transmission opportunity used to transmit the UTO-UCI were previously indicated as "not unused" occasions by the earlier UTO-UCI.

Figure 5:
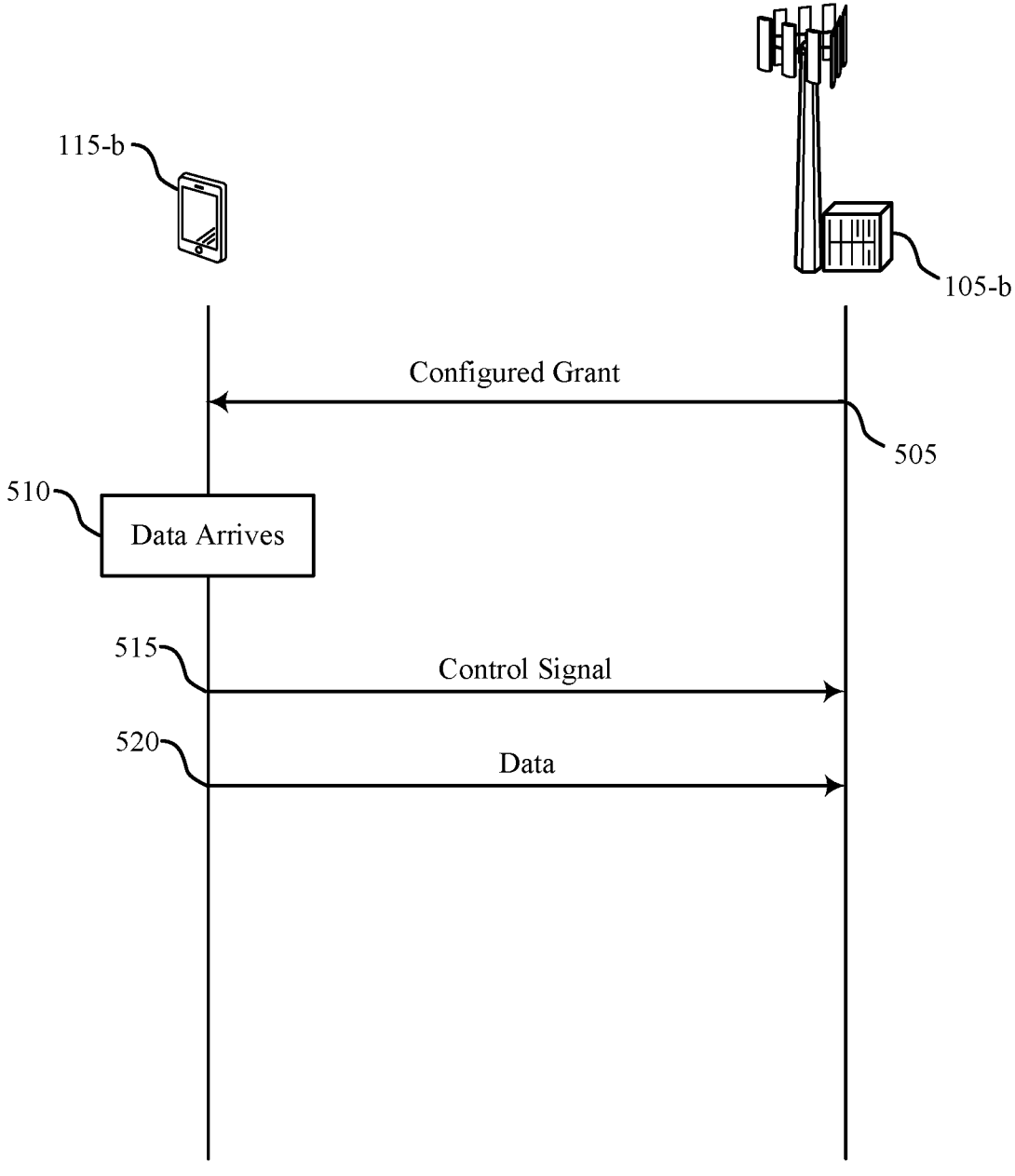
FIG. 5 shows an example of a process flow that supports indicating a shift of an uplink transmission bundle in accordance with one or more aspects of the present disclosure.

FIG. 5 shows an example of a process flow 500 that supports indicating a shift of an uplink transmission bundle in accordance with one or more aspects of the present disclosure. The process flow 500 may implement aspects of wireless communications system 100 or a wireless communications system 200. For instance, the process flow 500 may illustrate operations between a UE 115-b and a network entity 105-b, which may be respective examples of a UE 115 and a network entity 105 described herein. In the following description of the process flow 500, the operations between the UE 115-b and the network entity 105-b may be transmitted in a different order than the example order shown, or the operations performed by the UE 115-b and the network entity 105-b may be performed in different orders or at different times. Some operations also may be omitted from the process flow 500, and other operations may be added to the process flow 500.

At 505, the network entity 105-b may transmit control signaling to configure a configured grant at the UE 115-b. The UE 115-b may receive a first control signal indicating a set of parameters for a configured grant and indicating a repetition factor or a quantity of slots for a transport block for uplink data associated with the configured grant. For example, the UE 115-b may be configured for repetition, where the UE 115-b may transmit multiple repetitions of a transport block using multiple transmission opportunities of the configured grant. In some examples, the UE 115-b may be configured for TBoMS, where the UE 115-b may transmit a transport block over multiple slots or transmission occasions. For example, the UE 115-b may transmit K repetitions of a transport block, or the UE 115-b may transmit a transport block over K slots or transmission occasions.

In some examples, uplink data at the UE 115-b may have jitter or be prepared for transmission with uncertain timing. For example, the UE 115-b may be configured with the configured grant to transmit uplink video data, such as uplink XR video data. At 510, uplink data may arrive at the UE 115-b.

At 515, the UE 115-b may transmit a control signal to the network entity 105-b via an uplink shared channel resource (e.g., a PUSCH resource) during a first transmission occasion of the configured grant. For example, the UE 115-b may transmit, via the uplink shared channel resource during the first transmission occasion of the configured grant, a second control signal indicative of a shift value for a bundle of repetitions or slots of the transport block within a first set of transmission occasions of the configured grant based on an uplink jitter of the bundle. The second control signal may indicate one or more sets of unused transmission occasions of the configured grant (e.g., UTO-UCI) based at least in part on the shift value and either the repetition factor or the quantity of slots (e.g., K).

In some examples, the shift value and the UTO-UCI may be indicated via separate UCI. For example, the UE 115-b may transmit, via the uplink shared channel resource, a first UCI message and a second UCI message. The first UCI message may indicate the shift value, and the second UCI may indicate the UTO-UCI.

In some examples, the shift value may be indicated via a bitmap for the UTO-UCI. For example, the UE 115-b may transmit a UCI message including a field that indicates the shift value for the bundle and the UTO-UCI for the unused transmission occasions of the configured grant.

In some examples, the shift value may be implicitly indicated. For example, the UE 115-b may indicate the shift value based on a scrambling of DMRS transmitted over the PUSCH resources. For example, different DMRS scrambling, scrambling techniques, or scrambling sequences may be indicative of different shift values.

At 520, the UE 115-b may transmit the bundle using the first set of transmission occasions and a second set of transmission occasions according to the shift value. The UE 115-b may transmit a first repetition of the bundle or a first slot of the bundle using the first transmission occasion. For example, the UE 115-b may transmit the second control signal and a first repetition of the bundle or a first slot of the bundle using a PUSCH resource during the first transmission occasion of the first set of transmission occasions.

Figure 6:
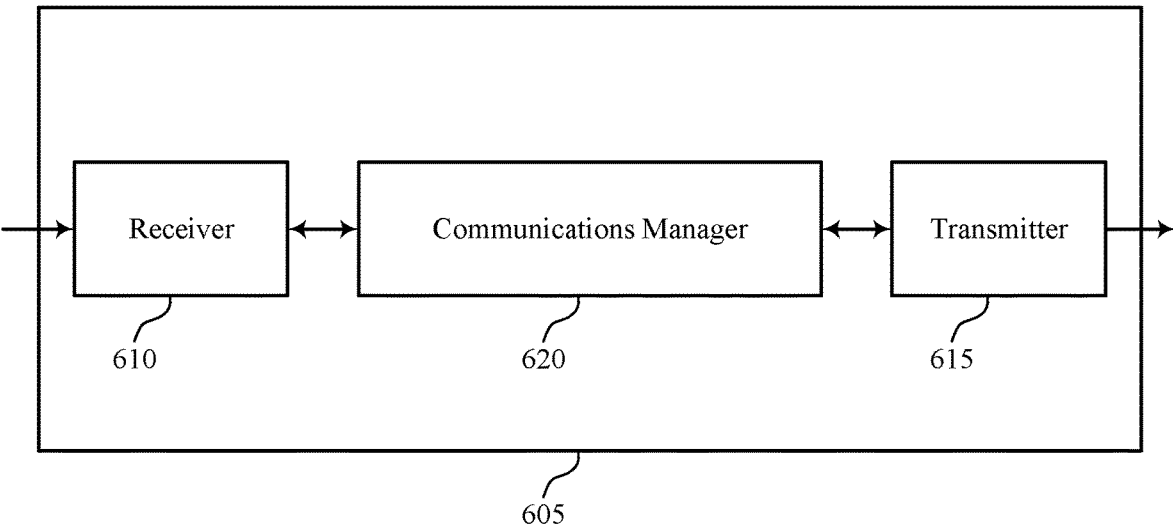
FIGS. 6 and 7 show block diagrams of devices that support indicating a shift of an uplink transmission bundle in accordance with one or more aspects of the present disclosure.

FIG. 6 shows a block diagram 600 of a device 605 that supports indicating a shift of an uplink transmission bundle in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor (not shown), which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to indicating a shift of an uplink transmission bundle). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to indicating a shift of an uplink transmission bundle). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of indicating a shift of an uplink transmission bundle as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving a first control signal indicating a set of parameters for a configured grant and indicating a repetition factor or a quantity of slots for a transport block for uplink data associated with the configured grant. The communications manager 620 is capable of, configured to, or operable to support a means for transmitting, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots. The communications manager 620 is capable of, configured to, or operable to support a means for transmitting the bundle using the first set of transmission occasions and a second set of transmission occasions according to the shift value, where a first repetition of the bundle or a first slot of the bundle is transmitted using the first transmission occasion.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for more efficient utilization of communication resources.

Figure 7:
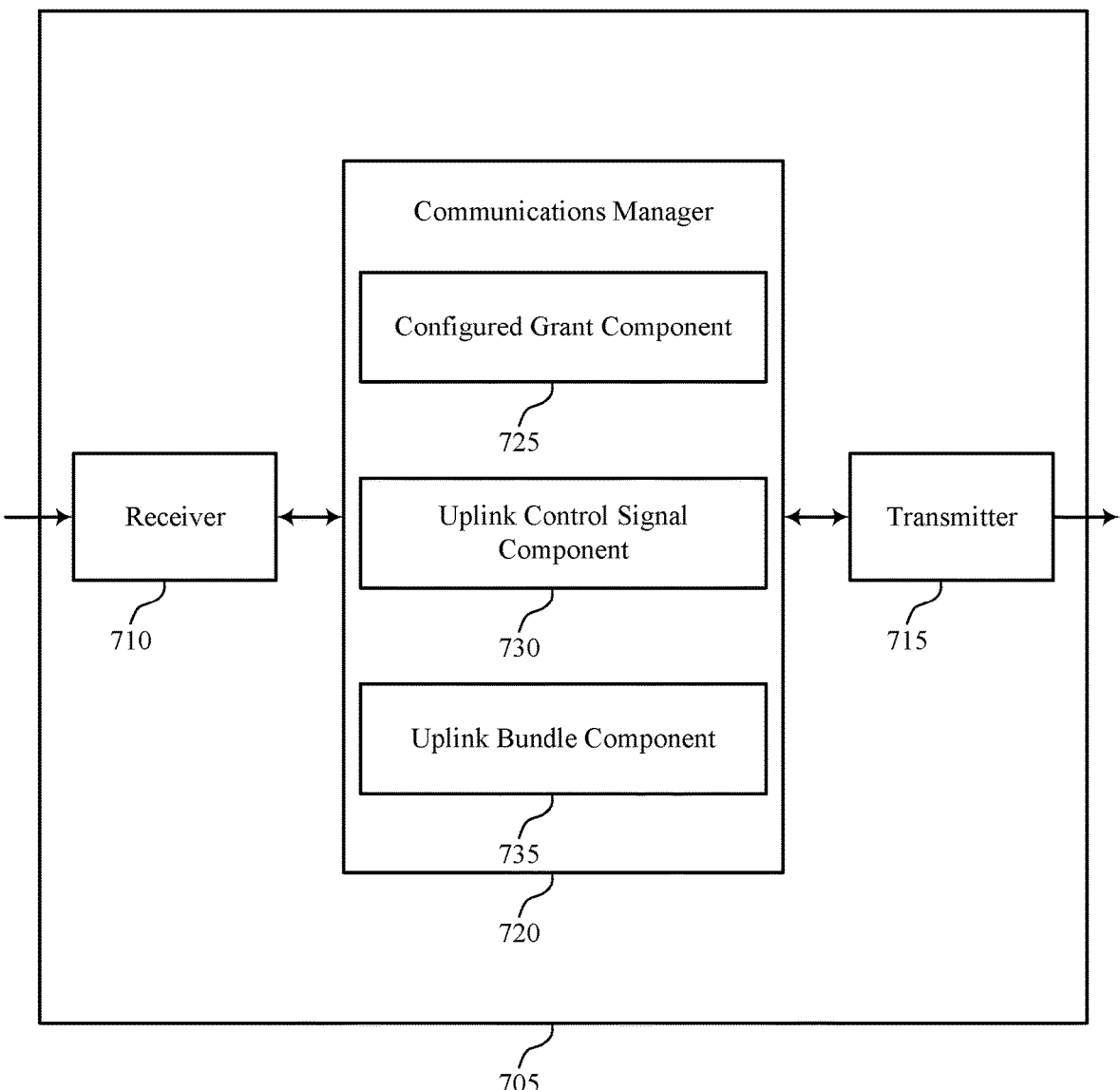

FIG. 7 shows a block diagram 700 of a device 705 that supports indicating a shift of an uplink transmission bundle in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor (not shown), which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to indicating a shift of an uplink transmission bundle). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to indicating a shift of an uplink transmission bundle). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of indicating a shift of an uplink transmission bundle as described herein. For example, the communications manager 720 may include a configured grant component 725, an uplink control signal component 730, an uplink bundle component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The configured grant component 725 is capable of, configured to, or operable to support a means for receiving a first control signal indicating a set of parameters for a configured grant and indicating a repetition factor or a quantity of slots for a transport block for uplink data associated with the configured grant. The uplink control signal component 730 is capable of, configured to, or operable to support a means for transmitting, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots. The uplink bundle component 735 is capable of, configured to, or operable to support a means for transmitting the bundle using the first set of transmission occasions and a second set of transmission occasions according to the shift value, where a first repetition of the bundle or a first slot of the bundle is transmitted using the first transmission occasion.

Figure 8:
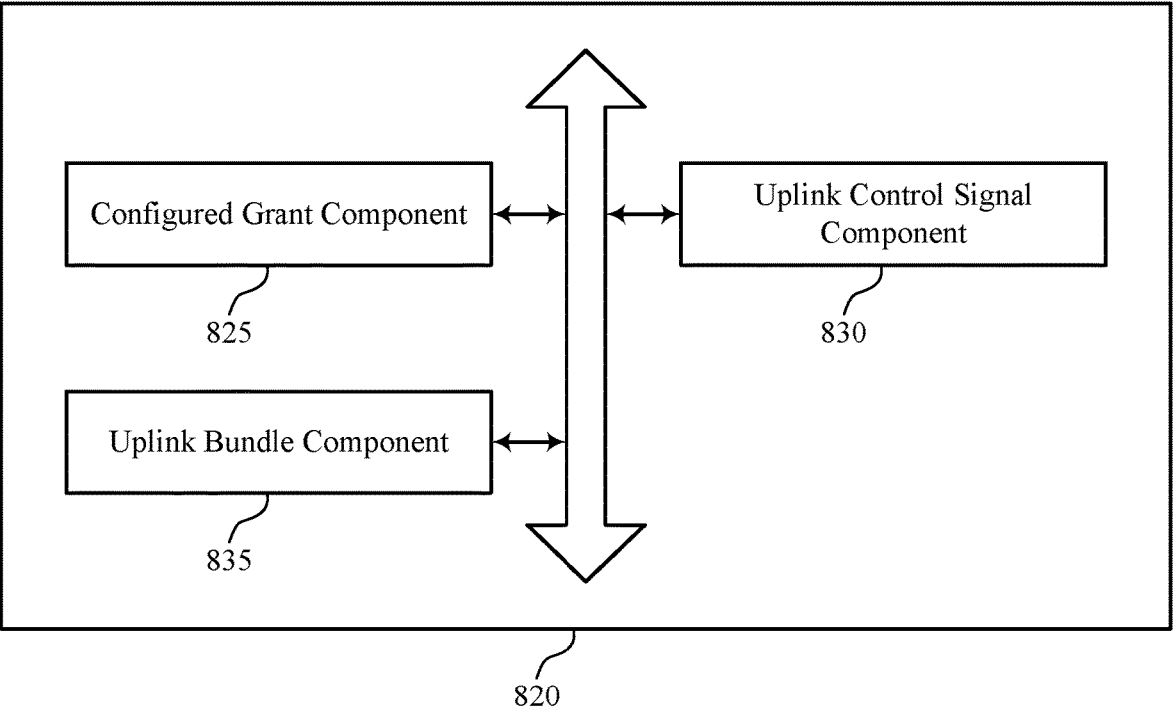
FIG. 8 shows a block diagram of a communications manager that supports indicating a shift of an uplink transmission bundle in accordance with one or more aspects of the present disclosure.
Figure 8:

FIG. 8 shows a block diagram 800 of a communications manager 820 that supports indicating a shift of an uplink transmission bundle in accordance with one or more aspects of the present disclosure. The communications manager 820 may be an example of aspects of a communications manager 620, a communications manager 720, or both, as described herein. The communications manager 820, or various components thereof, may be an example of means for performing various aspects of indicating a shift of an uplink transmission bundle as described herein. For example, the communications manager 820 may include a configured grant component 825, an uplink control signal component 830, an uplink bundle component 835, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The configured grant component 825 is capable of, configured to, or operable to support a means for receiving a first control signal indicating a set of parameters for a configured grant and indicating a repetition factor or a quantity of slots for a transport block for uplink data associated with the configured grant. The uplink control signal component 830 is capable of, configured to, or operable to support a means for transmitting, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots. The uplink bundle component 835 is capable of, configured to, or operable to support a means for transmitting the bundle using the first set of transmission occasions and a second set of transmission occasions according to the shift value, where a first repetition of the bundle or a first slot of the bundle is transmitted using the first transmission occasion.

In some examples, to support transmitting the second control signal, the uplink control signal component 830 is capable of, configured to, or operable to support a means for transmitting, via the uplink shared channel resource, a first uplink control information message and a second uplink control information message, where the first uplink control information message indicates the shift value, and the second uplink control information message indicates the one or more sets of unused transmission occasions of the configured grant.

In some examples, the uplink control signal component 830 is capable of, configured to, or operable to support a means for transmitting, via the uplink shared channel resource, an uplink control information message including a field that indicates the shift value for the bundle and the one or more sets of unused transmission occasions of the configured grant.

In some examples, the uplink control signal component 830 is capable of, configured to, or operable to support a means for scrambling a demodulation reference signal with a sequence that is indicative of the shift value, where the demodulation reference signal is transmitted via the uplink shared channel resource with the second control signal.

In some examples, the uplink bundle component 835 is capable of, configured to, or operable to support a means for jointly encoding the second control signal with the first repetition of the transport block of the bundle of repetitions of the transport block or with the first slot of the transport block of the bundle of slot of the transport block. In some examples, the uplink bundle component 835 is capable of, configured to, or operable to support a means for transmitting the first repetition or slot of the transport block with the second control signal based on jointly encoding the second control signal with the first repetition.

In some examples, each slot of the bundle or each repetition of the bundle includes a respective indication of a respective shift value and a respective one or more sets of unused transmission occasions.

In some examples, the set of parameters for the configured grant include a field location parameter for the shift value in the second control signal.

In some examples, the field location parameter for the shift value is associated with a set of multiple configured grants including the configured grant.

In some examples, the first set of transmission occasions is associated with a first HARQ identifier, the second set of transmission occasions is associated with a second HARQ identifier, and each repetition of the bundle or each slot of the bundle is associated with the first HARQ identifier or the second HARQ identifier.

In some examples, the first repetition of the bundle or the first slot of the bundle is associated with a first redundancy version of a redundancy version sequence.

In some examples, to support transmitting the second control signal, the uplink control signal component 830 is capable of, configured to, or operable to support a means for transmitting the second control signal indicative of a second shift value for a second bundle of repetitions or slots of a second transport block within a third set of transmission occasions of the configured grant.

In some examples, the uplink control signal component 830 is capable of, configured to, or operable to support a means for transmitting, via a second uplink shared channel resource during a second transmission occasion of the configured grant, a third control signal indicative of an updated shift value for the second bundle.

In some examples, the first set of transmission occasions or the second set of transmission occasions includes the second transmission occasion.

In some examples, the second control signal indicates that a set of multiple sets of transmission occasions including at least the third set of transmission occasions and a fourth set of transmission occasions that follows the third set of transmission occasions in time are used transmission occasions.

In some examples, the second control signal indicates that a set of multiple sets of transmission occasions including at least the first set of transmission occasions and the second set of transmission occasions are used transmission occasions.

In some examples, the shift value is in a range from zero to one less than the repetition factor or the quantity of slots.

In some examples, the first transmission occasion corresponds to a non-initial transmission occasion in time of the first set of transmission occasions.

Figure 9:
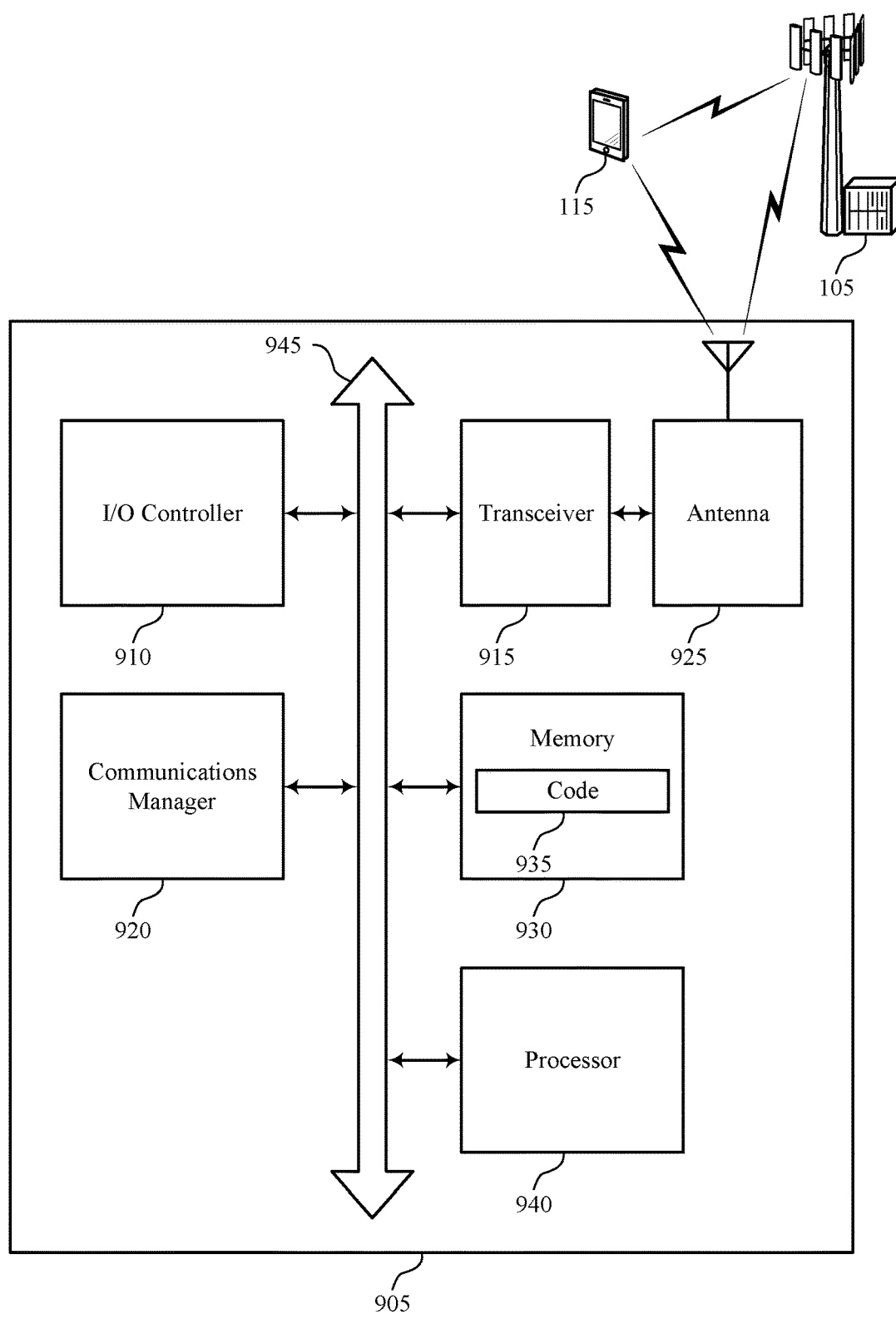
FIG. 9 shows a diagram of a system including a device that supports indicating a shift of an uplink transmission bundle in accordance with one or more aspects of the present disclosure.

FIG. 9 shows a diagram of a system 900 including a device 905 that supports indicating a shift of an uplink transmission bundle in accordance with one or more aspects of the present disclosure. The device 905 may be an example of or include components of a device 605, a device 705, or a UE 115 as described herein. The device 905 may communicate (e.g., wirelessly) with one or more other devices (e.g., network entities 105, UEs 115, or a combination thereof). The device 905 may include components for bi-directional voice and data communications including components for transmitting and receiving communications, such as a communications manager 920, an input/output (I/O) controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may include, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting indicating a shift of an uplink transmission bundle). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving a first control signal indicating a set of parameters for a configured grant and indicating a repetition factor or a quantity of slots for a transport block for uplink data associated with the configured grant. The communications manager 920 is capable of, configured to, or operable to support a means for transmitting, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots. The communications manager 920 is capable of, configured to, or operable to support a means for transmitting the bundle using the first set of transmission occasions and a second set of transmission occasions according to the shift value, where a first repetition of the bundle or a first slot of the bundle is transmitted using the first transmission occasion.

By including or configuring the communications manager 920 in accordance with examples as described herein, the device 905 may support techniques for reduced latency and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described herein with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of indicating a shift of an uplink transmission bundle as described herein, or the at least one processor 940 and the at least one memory 930 may be otherwise configured to, individually or collectively, perform or support such operations.

Figure 10:
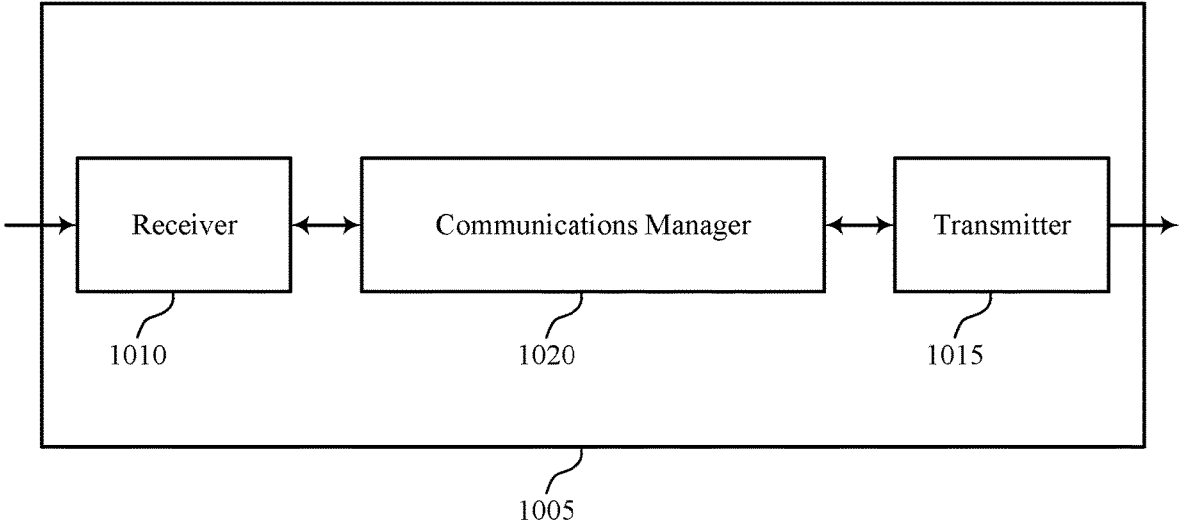
FIGS. 10 and 11 show block diagrams of devices that support indicating a shift of an uplink transmission bundle in accordance with one or more aspects of the present disclosure.

FIG. 10 shows a block diagram 1000 of a device 1005 that supports indicating a shift of an uplink transmission bundle in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor (not shown), which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations or components thereof may be examples of means for performing various aspects of indicating a shift of an uplink transmission bundle as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor (e.g., referred to as a processor-executable code). If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting a first control signal indicating a set of parameters for a configured grant and indicating a repetition factor or a quantity of slots for a transport block for uplink data associated with the configured grant. The communications manager 1020 is capable of, configured to, or operable to support a means for receiving, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots. The communications manager 1020 is capable of, configured to, or operable to support a means for receiving the bundle via the first set of uplink transmission occasions and a second set of uplink transmission occasions according to the shift value, where a first repetition of the bundle or a first slot of the bundle is received using the first uplink transmission occasion.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for more efficient utilization of communication resources.

Figure 11:
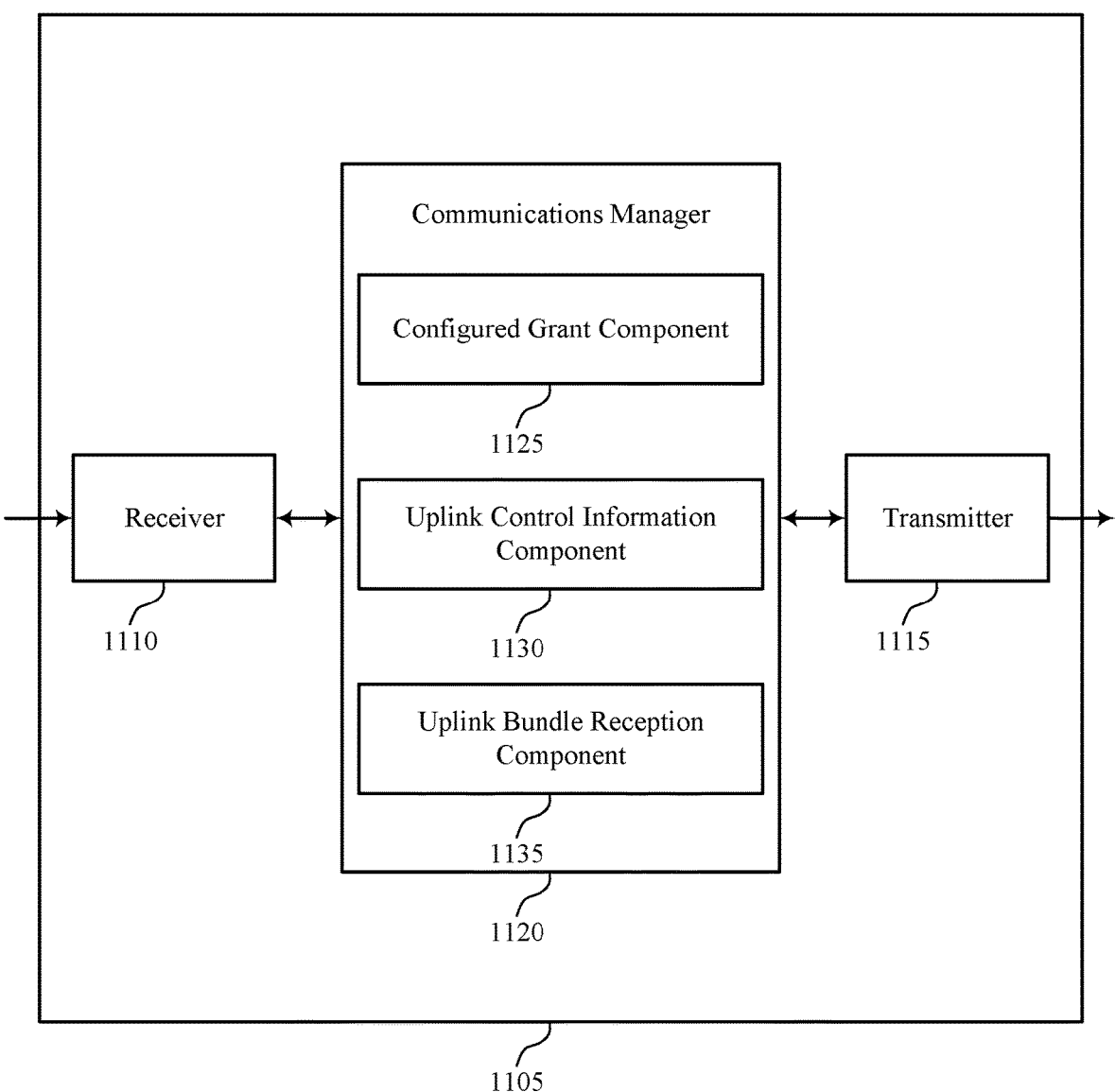

FIG. 11 shows a block diagram 1100 of a device 1105 that supports indicating a shift of an uplink transmission bundle in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor (not shown), which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of indicating a shift of an uplink transmission bundle as described herein. For example, the communications manager 1120 may include a configured grant component 1125, an uplink control information component 1130, an uplink bundle reception component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The configured grant component 1125 is capable of, configured to, or operable to support a means for transmitting a first control signal indicating a set of parameters for a configured grant and indicating a repetition factor or a quantity of slots for a transport block for uplink data associated with the configured grant. The uplink control information component 1130 is capable of, configured to, or operable to support a means for receiving, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots. The uplink bundle reception component 1135 is capable of, configured to, or operable to support a means for receiving the bundle via the first set of uplink transmission occasions and a second set of uplink transmission occasions according to the shift value, where a first repetition of the bundle or a first slot of the bundle is received using the first uplink transmission occasion.

Figure 12:
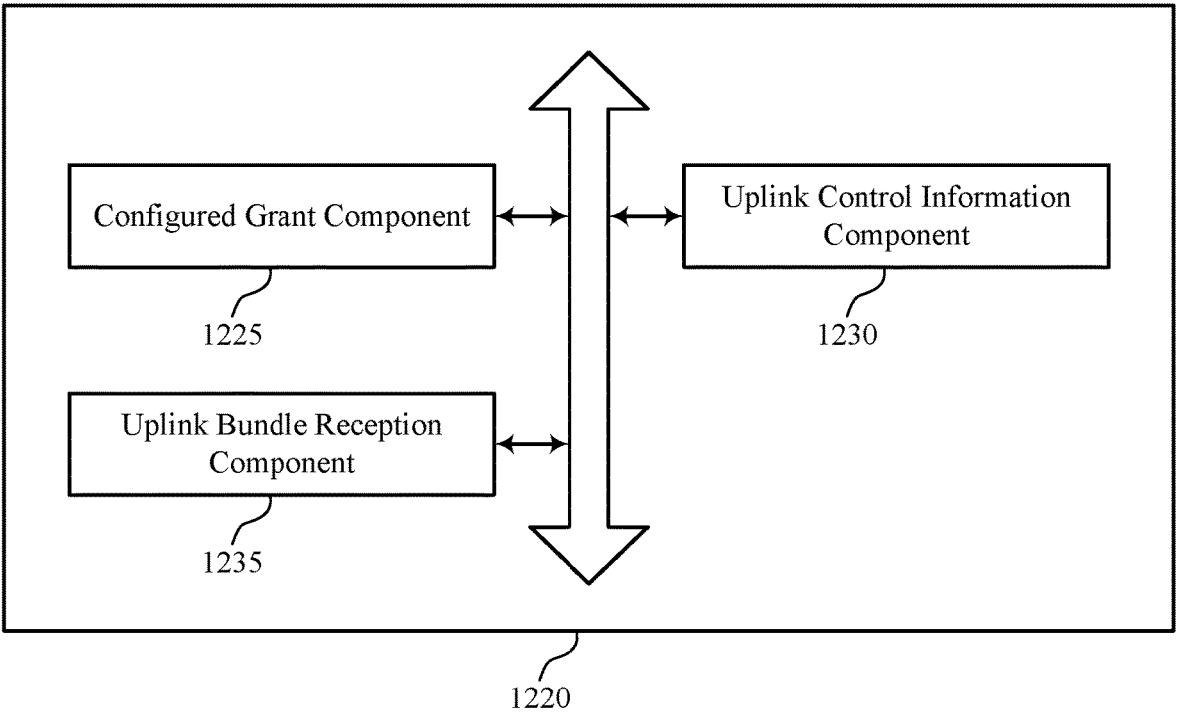
FIG. 12 shows a block diagram of a communications manager that supports indicating a shift of an uplink transmission bundle in accordance with one or more aspects of the present disclosure.

FIG. 12 shows a block diagram 1200 of a communications manager 1220 that supports indicating a shift of an uplink transmission bundle in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of indicating a shift of an uplink transmission bundle as described herein. For example, the communications manager 1220 may include a configured grant component 1225, an uplink control information component 1230, an uplink bundle reception component 1235, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The configured grant component 1225 is capable of, configured to, or operable to support a means for transmitting a first control signal indicating a set of parameters for a configured grant and indicating a repetition factor or a quantity of slots for a transport block for uplink data associated with the configured grant. The uplink control information component 1230 is capable of, configured to, or operable to support a means for receiving, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots. The uplink bundle reception component 1235 is capable of, configured to, or operable to support a means for receiving the bundle via the first set of uplink transmission occasions and a second set of uplink transmission occasions according to the shift value, where a first repetition of the bundle or a first slot of the bundle is received using the first uplink transmission occasion.

In some examples, to support receiving the second control signal, the uplink control information component 1230 is capable of, configured to, or operable to support a means for receiving, via the uplink shared channel resource, a first uplink control information message and a second uplink control information message, where the first uplink control information message indicates the shift value, and the second uplink control information message indicates the one or more sets of unused uplink transmission occasions of the configured grant.

In some examples, the uplink control information component 1230 is capable of, configured to, or operable to support a means for receiving, via the uplink shared channel resource, an uplink control information message including a field that indicates the shift value for the bundle and the one or more sets of unused uplink transmission occasions of the configured grant.

In some examples, the uplink control information component 1230 is capable of, configured to, or operable to support a means for receiving a demodulation reference signal via the uplink shared channel resource with the second control signal, where a sequence of the demodulation reference signal is indicative of the shift value.

In some examples, to support receiving the second control signal, the uplink bundle reception component 1235 is capable of, configured to, or operable to support a means for receiving the first repetition of the transport block with the second control signal based on a joint encoding of the second control signal with the first repetition.

In some examples, the set of parameters for the configured grant include a field location parameter for the shift value in the second control signal.

In some examples, the first set of uplink transmission occasions is associated with a first HARQ identifier, the second set of uplink transmission occasions is associated with a second HARQ identifier, and each repetition or slot of the bundle is associated with the first HARQ identifier or the second HARQ identifier.

In some examples, the first repetition or the first slot of the bundle is associated with a first redundancy version of a redundancy version sequence.

In some examples, to support receiving the second control signal, the uplink control information component 1230 is capable of, configured to, or operable to support a means for receiving the second control signal indicative of a second shift value for a second bundle of repetitions or slots of a second transport block within a third set of uplink transmission occasions of the configured grant.

In some examples, the uplink control information component 1230 is capable of, configured to, or operable to support a means for receiving, via a second uplink shared channel resource during a second uplink transmission occasion of the configured grant, a third control signal indicative of an updated shift value for the second bundle.

In some examples, the second control signal indicates that a set of multiple sets of uplink transmission occasions including at least the third set of uplink transmission occasions and a fourth set of uplink transmission occasions that follows the third set of uplink transmission occasions in time are used uplink transmission occasions.

Figure 13:
FIG. 13 shows a diagram of a system including a device that supports indicating a shift of an uplink transmission bundle in accordance with one or more aspects of the present disclosure.

FIG. 13 shows a diagram of a system 1300 including a device 1305 that supports indicating a shift of an uplink transmission bundle in accordance with one or more aspects of the present disclosure. The device 1305 may be an example of or include components of a device 1005, a device 1105, or a network entity 105 as described herein. The device 1305 may communicate with other network devices or network equipment such as one or more of the network entities 105, UEs 115, or any combination thereof. The communications may include communications over one or more wired interfaces, over one or more wireless interfaces, or any combination thereof. The device 1305 may include components that support outputting and obtaining communications, such as a communications manager 1320, a transceiver 1310, one or more antennas 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable, or processor-executable code, such as the code 1330. The code 1330 may include instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may include, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting indicating a shift of an uplink transmission bundle). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting a first control signal indicating a set of parameters for a configured grant and indicating a repetition factor or a quantity of slots for a transport block for uplink data associated with the configured grant. The communications manager 1320 is capable of, configured to, or operable to support a means for receiving, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots. The communications manager 1320 is capable of, configured to, or operable to support a means for receiving the bundle via the first set of uplink transmission occasions and a second set of uplink transmission occasions according to the shift value, where a first repetition of the bundle or a first slot of the bundle is received using the first uplink transmission occasion.

By including or configuring the communications manager 1320 in accordance with examples as described herein, the device 1305 may support techniques for reduced latency and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described herein with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of indicating a shift of an uplink transmission bundle as described herein, or the at least one processor 1335 and the at least one memory 1325 may be otherwise configured to, individually or collectively, perform or support such operations.

FIG. 14 shows a flowchart illustrating a method 1400 that supports indicating a shift of an uplink transmission bundle in accordance with one or more aspects of the present disclosure. The operations of the method 1400 may be implemented by a UE or its components as described herein. For example, the operations of the method 1400 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first control signal indicating a set of parameters for a configured grant and indicating a repetition factor or a quantity of slots for a transport block for uplink data associated with the configured grant. The operations of 1405 may be performed in accordance with examples as disclosed herein. In some examples, aspects of the operations of 1405 may be performed by a configured grant component 825 as described herein with reference to FIG. 8.

At 1410, the method may include transmitting, via an uplink shared channel resource during a first transmission occasion of the configured grant, a second control signal indicative of a shift value for a bundle of repetitions or slots of the transport block within a first set of transmission occasions of the configured grant based on an uplink jitter of the bundle, where the second control signal indicates one or more sets of unused transmission occasions of the configured grant based on the shift value and either the repetition factor or the quantity of slots. The operations of 1410 may be performed in accordance with examples as disclosed herein. In some examples, aspects of the operations of 1410 may be performed by an uplink control signal component 830 as described herein with reference to FIG. 8.

At 1415, the method may include transmitting the bundle using the first set of transmission occasions and a second set of transmission occasions according to the shift value, where a first repetition of the bundle or a first slot of the bundle is transmitted using the first transmission occasion. The operations of 1415 may be performed in accordance with examples as disclosed herein. In some examples, aspects of the operations of 1415 may be performed by an uplink bundle component 835 as described herein with reference to FIG. 8.

FIG. 15 shows a flowchart illustrating a method 1500 that supports indicating a shift of an uplink transmission bundle in accordance with one or more aspects of the present disclosure. The operations of the method 1500 may be implemented by a network entity or its components as described herein. For example, the operations of the method 1500 may be performed by a network entity as described herein with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a first control signal indicating a set of parameters for a configured grant and indicating a repetition factor or a quantity of slots for a transport block for uplink data associated with the configured grant. The operations of 1505 may be performed in accordance with examples as disclosed herein. In some examples, aspects of the operations of 1505 may be performed by a configured grant component 1225 as described herein with reference to FIG. 12.

At 1510, the method may include receiving, via an uplink shared channel resource during a first uplink transmission occasion of the configured grant, a second control signal indicative of a shift value for a bundle of repetitions or slots of the transport block within a first set of uplink transmission occasions of the configured grant based on an uplink jitter of the bundle, where the second control signal indicates one or more sets of unused uplink transmission occasions of the configured grant based on the shift value and either the repetition factor or the quantity of slots. The operations of 1510 may be performed in accordance with examples as disclosed herein. In some examples, aspects of the operations of 1510 may be performed by an uplink control information component 1230 as described herein with reference to FIG. 12.

At 1515, the method may include receiving the bundle via the first set of uplink transmission occasions and a second set of uplink transmission occasions according to the shift value, where a first repetition of the bundle or a first slot of the bundle is received using the first uplink transmission occasion. The operations of 1515 may be performed in accordance with examples as disclosed herein. In some examples, aspects of the operations of 1515 may be performed by an uplink bundle reception component 1235 as described herein with reference to FIG. 12.

The following provides an overview of aspects of the present disclosure:

Aspect 1: A method for wireless communications at a UE, comprising: receiving a first control signal indicating a set of parameters for a configured grant and indicating a repetition factor or a quantity of slots for a transport block for uplink data associated with the configured grant; transmitting, via an uplink shared channel resource during a first transmission occasion of the configured grant, a second control signal indicative of a shift value for a bundle of repetitions or slots of the transport block within a first set of transmission occasions of the configured grant based at least in part on an uplink jitter of the bundle, wherein the second control signal indicates one or more sets of unused transmission occasions of the configured grant based at least in part on the shift value and either the repetition factor or the quantity of slots; and transmitting the bundle using the first set of transmission occasions and a second set of transmission occasions according to the shift value, wherein a first repetition of the bundle or a first slot of the bundle is transmitted using the first transmission occasion.

Aspect 2: The method of aspect 1, wherein transmitting the second control signal comprises: transmitting, via the uplink shared channel resource, a first uplink control information message and a second uplink control information message, wherein the first uplink control information message indicates the shift value, and the second uplink control information message indicates the one or more sets of unused transmission occasions of the configured grant.

Aspect 3: The method of any of aspects 1 through 2, further comprising: transmitting, via the uplink shared channel resource, an uplink control information message comprising a field that indicates the shift value for the bundle and the one or more sets of unused transmission occasions of the configured grant.

Aspect 4: The method of any of aspects 1 through 3, further comprising: scrambling a demodulation reference signal with a sequence that is indicative of the shift value, wherein the demodulation reference signal is transmitted via the uplink shared channel resource with the second control signal.

Aspect 5: The method of any of aspects 1 through 4, further comprising: jointly encoding the second control signal with the first repetition of the transport block of the bundle of repetitions of the transport block or with the first slot of the transport block of the bundle of slot of the transport block; and transmitting the first repetition or slot of the transport block with the second control signal based at least in part on jointly encoding the second control signal with the first repetition.

Aspect 6: The method of any of aspects 1 through 5, wherein each slot of the bundle or each repetition of the bundle includes a respective indication of a respective shift value and a respective one or more sets of unused transmission occasions.

Aspect 7: The method of any of aspects 1 through 6, wherein the set of parameters for the configured grant comprise a field location parameter for the shift value in the second control signal.

Aspect 8: The method of aspect 7, wherein the field location parameter for the shift value is associated with a plurality of configured grants including the configured grant.

Aspect 9: The method of any of aspects 1 through 8, wherein the first set of transmission occasions is associated with a first HARQ identifier, the second set of transmission occasions is associated with a second HARQ identifier, and each repetition of the bundle or each slot of the bundle is associated with the first HARQ identifier or the second HARQ identifier.

Aspect 10: The method of any of aspects 1 through 9, wherein the first repetition of the bundle or the first slot of the bundle is associated with a first redundancy version of a redundancy version sequence.

Aspect 11: The method of any of aspects 1 through 10, wherein transmitting the second control signal comprises: transmitting the second control signal indicative of a second shift value for a second bundle of repetitions or slots of a second transport block within a third set of transmission occasions of the configured grant.

Aspect 12: The method of aspect 11, further comprising: transmitting, via a second uplink shared channel resource during a second transmission occasion of the configured grant, a third control signal indicative of an updated shift value for the second bundle.

Aspect 13: The method of aspect 12, wherein the first set of transmission occasions or the second set of transmission occasions comprises the second transmission occasion.

Aspect 14: The method of any of aspects 11 through 13, wherein the second control signal indicates that a plurality of sets of transmission occasions including at least the third set of transmission occasions and a fourth set of transmission occasions that follows the third set of transmission occasions in time are used transmission occasions.

Aspect 15: The method of any of aspects 1 through 14, wherein the second control signal indicates that a plurality of sets of transmission occasions including at least the first set of transmission occasions and the second set of transmission occasions are used transmission occasions.

Aspect 16: The method of any of aspects 1 through 15, wherein the shift value is in a range from zero to one less than the repetition factor or the quantity of slots.

Aspect 17: The method of any of aspects 1 through 16, wherein the first transmission occasion corresponds to a non-initial transmission occasion in time of the first set of transmission occasions.

Aspect 18: A method for wireless communications at a network entity, comprising: transmitting a first control signal indicating a set of parameters for a configured grant and indicating a repetition factor or a quantity of slots for a transport block for uplink data associated with the configured grant; receiving, via an uplink shared channel resource during a first uplink transmission occasion of the configured grant, a second control signal indicative of a shift value for a bundle of repetitions or slots of the transport block within a first set of uplink transmission occasions of the configured grant based at least in part on an uplink jitter of the bundle, wherein the second control signal indicates one or more sets of unused uplink transmission occasions of the configured grant based at least in part on the shift value and either the repetition factor or the quantity of slots; and receiving the bundle via the first set of uplink transmission occasions and a second set of uplink transmission occasions according to the shift value, wherein a first repetition of the bundle or a first slot of the bundle is received using the first uplink transmission occasion.

Aspect 19: The method of aspect 18, wherein receiving the second control signal comprises: receiving, via the uplink shared channel resource, a first uplink control information message and a second uplink control information message, wherein the first uplink control information message indicates the shift value, and the second uplink control information message indicates the one or more sets of unused uplink transmission occasions of the configured grant.

Aspect 20: The method of any of aspects 18 through 19, further comprising: receiving, via the uplink shared channel resource, an uplink control information message comprising a field that indicates the shift value for the bundle and the one or more sets of unused uplink transmission occasions of the configured grant.

Aspect 21: The method of any of aspects 18 through 20, further comprising: receiving a demodulation reference signal via the uplink shared channel resource with the second control signal, wherein a sequence of the demodulation reference signal is indicative of the shift value.

Aspect 22: The method of any of aspects 18 through 21, wherein receiving the second control signal comprises: receiving the first repetition of the transport block with the second control signal based at least in part on a joint encoding of the second control signal with the first repetition.

Aspect 23: The method of any of aspects 18 through 22, wherein the set of parameters for the configured grant comprise a field location parameter for the shift value in the second control signal.

Aspect 24: The method of any of aspects 18 through 23, wherein the first set of uplink transmission occasions is associated with a first HARQ identifier, the second set of uplink transmission occasions is associated with a second HARQ identifier, and each repetition or slot of the bundle is associated with the first HARQ identifier or the second HARQ identifier.

Aspect 25: The method of any of aspects 18 through 24, wherein the first repetition or the first slot of the bundle is associated with a first redundancy version of a redundancy version sequence.

Aspect 26: The method of any of aspects 18 through 25, wherein receiving the second control signal comprises: receiving the second control signal indicative of a second shift value for a second bundle of repetitions or slots of a second transport block within a third set of uplink transmission occasions of the configured grant.

Aspect 27: The method of aspect 26, further comprising: receiving, via a second uplink shared channel resource during a second uplink transmission occasion of the configured grant, a third control signal indicative of an updated shift value for the second bundle.

Aspect 28: The method of any of aspects 26 through 27, wherein the second control signal indicates that a plurality of sets of uplink transmission occasions including at least the third set of uplink transmission occasions and a fourth set of uplink transmission occasions that follows the third set of uplink transmission occasions in time are used uplink transmission occasions.

Aspect 29: A UE for wireless communications, comprising at least one processor and at least one memory coupled with the at least one processor, with instructions stored in the at least one memory, the instructions being executable by the at least one processor, individually or in any combination, to cause the UE to perform a method of any of aspects 1 through 17.

Aspect 30: A UE for wireless communications, comprising at least one means for performing a method of any of aspects 1 through 17.

Aspect 31: A non-transitory computer-readable medium storing code for wireless communications, the code comprising instructions executable by one or more processors to perform a method of any of aspects 1 through 17.

Aspect 32: A network entity for wireless communications, comprising at least one processor and at least one memory coupled with the at least one processor, with instructions stored in the at least one memory, the instructions being executable by the at least one processor, individually or in any combination, to cause the network entity to perform a method of any of aspects 18 through 28.

Aspect 33: A network entity for wireless communications, comprising at least one means for performing a method of any of aspects 18 through 28.

Aspect 34: A non-transitory computer-readable medium storing code for wireless communications, the code comprising instructions executable by one or more processors to perform a method of any of aspects 18 through 28.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
at least one processor; and
at least one memory coupled with the at least one processor, with instructions stored in the at least one memory, the instructions being executable by the at least one processor, individually or in any combination, to cause the UE to:
  receive a first control signal indicating a set of parameters for a configured grant and indicating a repetition factor or a quantity of slots for a transport block for uplink data associated with the configured grant;
  transmit, via an uplink shared channel resource during a first transmission occasion of the configured grant, a second control signal indicative of a shift value for a bundle of repetitions or slots of the transport block within a first set of transmission occasions of the configured grant based at least in part on an uplink jitter of the bundle, wherein the second control signal indicates one or more sets of unused transmission occasions of the configured grant based at least in part on the shift value and either the repetition factor or the quantity of slots; and
  transmit the bundle using the first set of transmission occasions and a second set of transmission occasions according to the shift value, wherein a first repetition of the bundle or a first slot of the bundle is transmitted using the first transmission occasion.

2. The UE of claim 1, wherein, to transmit the second control signal, the instructions are further executable to cause the UE to:
  transmit, via the uplink shared channel resource, a first uplink control information message and a second uplink control information message, wherein the first uplink control information message indicates the shift value, and the second uplink control information message indicates the one or more sets of unused transmission occasions of the configured grant.

3. The UE of claim 1, wherein the instructions are further executable to cause the UE to:
  transmit, via the uplink shared channel resource, an uplink control information message comprising a field that indicates the shift value for the bundle and the one or more sets of unused transmission occasions of the configured grant.

4. The UE of claim 1, wherein the instructions are further executable to cause the UE to:
  scramble a demodulation reference signal with a sequence that is indicative of the shift value, wherein the demodulation reference signal is transmitted via the uplink shared channel resource with the second control signal.

5. The UE of claim 1, wherein the instructions are further executable to cause the UE to:
  jointly encode the second control signal with the first repetition of the transport block of the bundle of repetitions of the transport block or with the first slot of the transport block of the bundle of slot of the transport block; and
  transmit the first repetition or slot of the transport block with the second control signal based at least in part on jointly encoding the second control signal with the first repetition.

6. The UE of claim 1, wherein each slot of the bundle or each repetition of the bundle includes a respective indication of a respective shift value and a respective one or more sets of unused transmission occasions.

7. The UE of claim 1, wherein the set of parameters for the configured grant comprise a field location parameter for the shift value in the second control signal.

8. The UE of claim 7, wherein the field location parameter for the shift value is associated with a plurality of configured grants including the configured grant.

9. The UE of claim 1, wherein the first set of transmission occasions is associated with a first hybrid automatic repeat request (HARQ) identifier, the second set of transmission occasions is associated with a second HARQ identifier, and each repetition of the bundle or each slot of the bundle is associated with the first HARQ identifier or the second HARQ identifier.

10. The UE of claim 1, wherein the first repetition of the bundle or the first slot of the bundle is associated with a first redundancy version of a redundancy version sequence.

11. The UE of claim 1, wherein, to transmit the second control signal, the instructions are further executable to cause the UE to:
  transmit the second control signal indicative of a second shift value for a second bundle of repetitions or slots of a second transport block within a third set of transmission occasions of the configured grant.

12. The UE of claim 11, wherein the instructions are further executable to cause the UE to:
  transmit, via a second uplink shared channel resource during a second transmission occasion of the configured grant, a third control signal indicative of an updated shift value for the second bundle.

13. The UE of claim 12, wherein the first set of transmission occasions or the second set of transmission occasions comprises the second transmission occasion.

14. The UE of claim 11, wherein the second control signal indicates that a plurality of sets of transmission occasions including at least the third set of transmission occasions and a fourth set of transmission occasions that follows the third set of transmission occasions in time are used transmission occasions.

15. The UE of claim 1, wherein the second control signal indicates that a plurality of sets of transmission occasions including at least the first set of transmission occasions and the second set of transmission occasions are used transmission occasions.

16. The UE of claim 1, wherein the shift value is in a range from zero to one less than the repetition factor or the quantity of slots.

17. The UE of claim 1, wherein the first transmission occasion corresponds to a non-initial transmission occasion in time of the first set of transmission occasions.

18. A network entity, comprising:

at least one processor; and at least one memory coupled with the at least one processor, with instructions stored in the at least one memory, the instructions being executable by the at least one processor, individually or in any combination, to cause the network entity to:

transmit a first control signal indicating a set of parameters for a configured grant and indicating a repetition factor or a quantity of slots for a transport block for uplink data associated with the configured grant;

receive, via an uplink shared channel resource during a first uplink transmission occasion of the configured grant, a second control signal indicative of a shift value for a bundle of repetitions or slots of the transport block within a first set of uplink transmission occasions of the configured grant based at least in part on an uplink jitter of the bundle, wherein the second control signal indicates one or more sets of unused uplink transmission occasions of the configured grant based at least in part on the shift value and either the repetition factor or the quantity of slots; and receive the bundle via the first set of uplink transmission occasions and a second set of uplink transmission occasions according to the shift value, wherein a first repetition of the bundle or a first slot of the bundle is received using the first uplink transmission occasion.

19. The network entity of claim 18, wherein, to receive the second control signal, the instructions are further executable to cause the network entity to:

receive, via the uplink shared channel resource, a first uplink control information message and a second uplink control information message, wherein the first uplink control information message indicates the shift value, and the second uplink control information message indicates the one or more sets of unused uplink transmission occasions of the configured grant.

20. The network entity of claim 18, wherein the instructions are further executable to cause the network entity to:

receive, via the uplink shared channel resource, an uplink control information message comprising a field that indicates the shift value for the bundle and the one or more sets of unused uplink transmission occasions of the configured grant.

21. The network entity of claim 18, wherein the instructions are further executable to cause the network entity to:

receive a demodulation reference signal via the uplink shared channel resource with the second control signal, wherein a sequence of the demodulation reference signal is indicative of the shift value.

22. The network entity of claim 18, wherein, to receive the second control signal, the instructions are further executable to cause the network entity to:

receive the first repetition of the transport block with the second control signal based at least in part on a joint encoding of the second control signal with the first repetition.

23. The network entity of claim 18, wherein the set of parameters for the configured grant comprise a field location parameter for the shift value in the second control signal.

24. The network entity of claim 18, wherein the first set of uplink transmission occasions is associated with a first hybrid automatic repeat request (HARQ) identifier, the second set of uplink transmission occasions is associated with a second HARQ identifier, and each repetition or slot of the bundle is associated with the first HARQ identifier or the second HARQ identifier.

25. The network entity of claim 18, wherein the first repetition or the first slot of the bundle is associated with a first redundancy version of a redundancy version sequence.

26. The network entity of claim 18, wherein, to receive the second control signal, the instructions are further executable to cause the network entity to:

receive the second control signal indicative of a second shift value for a second bundle of repetitions or slots of a second transport block within a third set of uplink transmission occasions of the configured grant.

27. The network entity of claim 26, wherein the instructions are further executable to cause the network entity to:

receive, via a second uplink shared channel resource during a second uplink transmission occasion of the configured grant, a third control signal indicative of an updated shift value for the second bundle.

28. The network entity of claim 26, wherein the second control signal indicates that a plurality of sets of uplink transmission occasions including at least the third set of uplink transmission occasions and a fourth set of uplink transmission occasions that follows the third set of uplink transmission occasions in time are used uplink transmission occasions.

29. A method for wireless communications at a user equipment (UE), comprising:

receiving a first control signal indicating a set of parameters for a configured grant and indicating a repetition factor or a quantity of slots for a transport block for uplink data associated with the configured grant;

transmitting, via an uplink shared channel resource during a first transmission occasion of the configured grant, a second control signal indicative of a shift value for a bundle of repetitions or slots of the transport block within a first set of transmission occasions of the configured grant based at least in part on an uplink jitter of the bundle, wherein the second control signal indicates one or more sets of unused transmission occasions of the configured grant based at least in part on the shift value and either the repetition factor or the quantity of slots; and transmitting the bundle using the first set of transmission occasions and a second set of transmission occasions according to the shift value, wherein a first repetition of the bundle or a first slot of the bundle is transmitted using the first transmission occasion.

30. A method for wireless communications at a network entity, comprising:

transmitting a first control signal indicating a set of parameters for a configured grant and indicating a repetition factor or a quantity of slots for a transport block for uplink data associated with the configured grant;

receiving, via an uplink shared channel resource during a first uplink transmission occasion of the configured grant, a second control signal indicative of a shift value for a bundle of repetitions or slots of the transport block within a first set of uplink transmission occasions of the configured grant based at least in part on an uplink jitter of the bundle, wherein the second control signal indicates one or more sets of unused uplink transmission occasions of the configured grant based at least in part on the shift value and either the repetition factor or the quantity of slots; and receiving the bundle via the first set of uplink transmission occasions and a second set of uplink transmission occasions according to the shift value, wherein a first repetition of the bundle or a first slot of the bundle is received using the first uplink transmission occasion.

* * * * *